United States Patent
Carlier et al.

(10) Patent No.: US 9,915,589 B2
(45) Date of Patent: Mar. 13, 2018

(54) SYSTEM AND METHOD FOR DETERMINING A LOCATION OF FOULING ON BOILER HEAT TRANSFER SURFACE

(71) Applicant: INTERNATIONAL PAPER COMPANY, Memphis, TN (US)

(72) Inventors: Timothy M. Carlier, Terrace Park, OH (US); Andrew K. Jones, Cincinnati, OH (US)

(73) Assignee: INTERNATIONAL PAPER COMPANY, Memphis, TN (US)

(*) Notice: Subject to any disclaimer, the term of this patent is extended or adjusted under 35 U.S.C. 154(b) by 261 days.

(21) Appl. No.: 14/808,164

(22) Filed: Jul. 24, 2015

(65) Prior Publication Data
US 2016/0025600 A1 Jan. 28, 2016

Related U.S. Application Data

(60) Provisional application No. 62/028,830, filed on Jul. 25, 2014.

(51) Int. Cl.
| | |
|---|---|
| *G01M 99/00* | (2011.01) |
| *F28G 3/16* | (2006.01) |
| *F28G 15/00* | (2006.01) |
| *F28G 15/02* | (2006.01) |
| *F28G 15/04* | (2006.01) |
| *G01D 5/00* | (2006.01) |
| *G01L 1/22* | (2006.01) |
| *G01L 5/00* | (2006.01) |

(52) U.S. Cl.
CPC ........... *G01M 99/007* (2013.01); *F28G 3/166* (2013.01); *F28G 15/003* (2013.01); *F28G 15/02* (2013.01); *F28G 15/04* (2013.01); *G01D 5/00* (2013.01); *G01L 1/22* (2013.01); *G01L 5/0052* (2013.01)

(58) Field of Classification Search
CPC .... G01M 99/007; F28G 3/166; F28G 15/003; F28G 15/02; F28G 15/04; G01D 5/00; G01L 1/22; G01L 5/0052
USPC .......................................................... 73/788
See application file for complete search history.

(56) References Cited

U.S. PATENT DOCUMENTS

| | | | |
|---|---|---|---|
| 2,416,462 | A | 2/1947 | Wilcoxson |
| 2,819,702 | A | 1/1958 | Koch |
| 2,830,440 | A | 4/1958 | Durham |
| 2,832,323 | A | 4/1958 | Craig |

(Continued)

FOREIGN PATENT DOCUMENTS

| | | |
|---|---|---|
| CA | 2387369 | 10/2009 |
| EP | 0071815 | 2/1983 |

(Continued)

*Primary Examiner* — Lisa Caputo
*Assistant Examiner* — Nathaniel T Woodward
(74) *Attorney, Agent, or Firm* — Thomas W. Barnes, III

(57) ABSTRACT

Detecting fouling of a heat exchanger of a boiler includes emitting a spray of pressurized fluid from a nozzle of a sootblower element when the nozzle is adjacent to a surface of the heat exchanger, and sensing a value indicative of a reactive force created by an impact of the pressurized fluid on the surface of the heat exchanger and translated back to the sootblower element through the spray of the pressurized fluid. The method also includes determining when a substantial deposit is on the surface of the heat exchanger indicating fouling based on the value indicative of the reactive force.

32 Claims, 16 Drawing Sheets

(56) References Cited

U.S. PATENT DOCUMENTS

| | | | |
|---|---|---|---|
| 2,962,006 | A | 11/1960 | Blodgett |
| 2,966,896 | A | 1/1961 | Vogler |
| 3,028,844 | A | 4/1962 | Durham et al. |
| 3,040,719 | A | 6/1962 | Dickey |
| 3,161,180 | A | 12/1964 | Durham et al. |
| 3,207,134 | A | 9/1965 | Miller |
| 3,246,635 | A | 4/1966 | Powell et al. |
| 3,274,979 | A | 9/1966 | Petit |
| 3,291,106 | A | 12/1966 | Palchik et al. |
| 3,362,384 | A | 1/1968 | Caracristi |
| 3,364,903 | A | 1/1968 | Covell et al. |
| 3,436,786 | A * | 4/1969 | Rickard ................ F28G 3/166 15/317 |
| 3,439,376 | A | 4/1969 | Nelson et al. |
| 3,452,722 | A | 7/1969 | Evers |
| 3,575,002 | A | 4/1971 | Vuia |
| 3,831,561 | A * | 8/1974 | Yamamoto ............. F22B 37/42 122/379 |
| 3,955,358 | A | 5/1976 | Martz et al. |
| 3,965,675 | A | 6/1976 | Martz et al. |
| 3,974,644 | A | 8/1976 | Martz et al. |
| 4,004,647 | A | 1/1977 | Forst et al. |
| 4,028,884 | A | 6/1977 | Martz et al. |
| 4,031,404 | A | 6/1977 | Martz et al. |
| 4,037,469 | A | 7/1977 | Nordstrom et al. |
| 4,085,438 | A | 4/1978 | Butler |
| 4,099,384 | A | 7/1978 | Stevens et al. |
| 4,237,825 | A | 12/1980 | Kochey |
| 4,339,998 | A | 7/1982 | Finch |
| 4,351,277 | A | 9/1982 | Ryan et al. |
| 4,359,800 | A | 11/1982 | Ziels |
| 4,375,710 | A | 3/1983 | Hammond |
| 4,377,134 | A | 3/1983 | Frey |
| 4,380,843 | A | 4/1983 | Sullivan et al. |
| 4,411,204 | A | 10/1983 | Hamilton |
| 4,421,067 | A | 12/1983 | Krowech |
| 4,422,882 | A | 12/1983 | Nelson et al. |
| 4,430,963 | A | 2/1984 | Finet |
| 4,454,840 | A | 6/1984 | Dziubakowski |
| 4,466,383 | A | 8/1984 | Klatt et al. |
| 4,475,482 | A | 10/1984 | Moss et al. |
| 4,488,516 | A | 12/1984 | Bueters et al. |
| 4,492,187 | A | 1/1985 | Hammond |
| 4,539,840 | A | 9/1985 | Klatt et al. |
| 4,565,324 | A | 1/1986 | Rebula et al. |
| 4,567,622 | A | 2/1986 | Ziels |
| 4,599,975 | A | 7/1986 | Reeve et al. |
| 4,621,583 | A | 11/1986 | Kaski |
| 4,716,856 | A | 1/1988 | Beisswenger et al. |
| 4,718,363 | A | 1/1988 | Williames |
| 4,718,376 | A | 1/1988 | Leroueil et al. |
| RE32,723 | E | 8/1988 | Neundorfer |
| 4,779,690 | A | 10/1988 | Woodman |
| 4,803,959 | A * | 2/1989 | Sherrick ................ F28G 3/166 122/379 |
| 4,887,431 | A | 12/1989 | Peet |
| 4,920,994 | A | 5/1990 | Nachbar |
| 4,957,049 | A | 9/1990 | Strohmeyer |
| 4,980,674 | A | 12/1990 | Scheibel et al. |
| 4,986,391 | A | 1/1991 | Salmon |
| 4,996,951 | A | 3/1991 | Archer et al. |
| 5,027,751 | A | 7/1991 | Archer et al. |
| 5,048,636 | A | 9/1991 | Roehrs |
| 5,050,108 | A | 9/1991 | Clark et al. |
| 5,063,632 | A | 11/1991 | Clark et al. |
| 5,065,472 | A | 11/1991 | Carpenter et al. |
| 5,090,087 | A | 2/1992 | Hipple et al. |
| 5,113,802 | A | 5/1992 | Leblanc |
| 5,181,482 | A | 1/1993 | Labbe et al. |
| 5,209,324 | A | 5/1993 | Hogbacka |
| 5,230,306 | A | 7/1993 | Barringer et al. |
| 5,237,718 | A | 8/1993 | Brown |
| 5,241,723 | A | 9/1993 | Garrabrant |
| 5,261,965 | A | 11/1993 | Moslehi |
| 5,267,533 | A | 12/1993 | Smith |
| 5,271,356 | A | 12/1993 | Kling et al. |
| 5,286,063 | A | 2/1994 | Huston |
| 5,299,533 | A | 4/1994 | Johnston et al. |
| 5,305,713 | A | 4/1994 | Vadakin |
| 5,320,073 | A | 6/1994 | Silcott et al. |
| 5,348,774 | A | 9/1994 | Golecki et al. |
| 5,353,996 | A | 10/1994 | Gallacher et al. |
| 5,365,890 | A | 11/1994 | Johnston, Jr. et al. |
| 5,375,771 | A | 12/1994 | Jamelle et al. |
| 5,379,727 | A | 1/1995 | Kling et al. |
| 5,398,623 | A | 3/1995 | Lautenschlager et al. |
| 5,416,946 | A | 5/1995 | Brown et al. |
| 5,423,272 | A | 6/1995 | Dunn et al. |
| 5,423,483 | A | 6/1995 | Schwade |
| 5,429,076 | A | 7/1995 | Johnston, Jr. et al. |
| 5,451,002 | A * | 9/1995 | Amuny ................ B08B 9/0323 122/379 |
| 5,477,683 | A | 12/1995 | Persson |
| 5,505,163 | A | 4/1996 | Jameel |
| 5,509,607 | A | 4/1996 | Booher et al. |
| 5,522,348 | A | 6/1996 | Tanaka et al. |
| 5,530,987 | A | 7/1996 | Piccirillo et al. |
| 5,549,079 | A | 8/1996 | Johnston, Jr. et al. |
| 5,549,305 | A | 8/1996 | Freund |
| 5,553,778 | A | 9/1996 | Jameel et al. |
| 5,605,117 | A | 2/1997 | Moskal |
| 5,606,924 | A | 3/1997 | Martin et al. |
| 5,615,734 | A | 4/1997 | Hyp |
| 5,619,771 | A | 4/1997 | Minic |
| 5,626,184 | A | 5/1997 | Campbell et al. |
| 5,663,489 | A | 9/1997 | Thungstrom et al. |
| 5,675,863 | A | 10/1997 | Holden et al. |
| 5,740,745 | A | 4/1998 | Smyrniotis et al. |
| 5,745,950 | A | 5/1998 | Holden et al. |
| 5,756,880 | A | 5/1998 | Chen et al. |
| 5,765,510 | A | 6/1998 | Krowech et al. |
| 5,769,034 | A | 6/1998 | Zilka et al. |
| 5,769,035 | A | 6/1998 | Fiedler |
| 5,778,830 | A | 7/1998 | Wall |
| 5,778,831 | A | 7/1998 | Jameel |
| 5,793,014 | A | 8/1998 | Sobkowiak et al. |
| 5,836,268 | A | 11/1998 | Wall |
| 5,894,806 | A | 4/1999 | Smyrniotis et al. |
| 5,920,951 | A | 7/1999 | Piccirillo et al. |
| 5,943,865 | A | 8/1999 | Cohen |
| 5,983,639 | A | 11/1999 | Kral et al. |
| 6,050,227 | A * | 4/2000 | LaMotte ................ F28G 15/02 122/379 |
| 6,065,528 | A | 5/2000 | Fierle et al. |
| 6,073,641 | A | 6/2000 | Bude et al. |
| 6,105,590 | A | 8/2000 | Martin et al. |
| 6,109,096 | A | 8/2000 | Chen et al. |
| 6,170,117 | B1 | 1/2001 | Batt |
| 6,178,924 | B1 | 1/2001 | Hakulinen et al. |
| 6,244,098 | B1 | 6/2001 | Chen et al. |
| 6,321,690 | B1 | 11/2001 | Zilka et al. |
| 6,323,442 | B1 * | 11/2001 | Jones ................ F22B 37/56 122/379 |
| 6,325,025 | B1 | 12/2001 | Perrone |
| 6,425,352 | B2 | 7/2002 | Perrone |
| 6,431,073 | B1 | 8/2002 | Zilka et al. |
| 6,437,285 | B1 | 8/2002 | Thomas et al. |
| 6,575,122 | B2 | 6/2003 | Hipple |
| 6,581,549 | B2 | 6/2003 | Stewart et al. |
| 6,604,468 | B2 | 8/2003 | Zilka et al. |
| 6,644,201 | B2 | 11/2003 | Zilka et al. |
| 6,681,839 | B1 * | 1/2004 | Balzer ................ F28G 1/163 122/379 |
| 6,710,285 | B2 | 3/2004 | Brown et al. |
| 6,715,499 | B2 | 4/2004 | Bartels et al. |
| 6,725,911 | B2 | 4/2004 | Jayaweera et al. |
| 6,736,089 | B1 | 5/2004 | Lefebvre et al. |
| 6,755,156 | B1 | 6/2004 | Zilka et al. |
| 6,764,030 | B2 | 7/2004 | Habib et al. |
| 6,772,775 | B2 | 8/2004 | Ackerman et al. |
| 6,782,902 | B2 | 8/2004 | Shover et al. |
| 6,892,679 | B2 | 5/2005 | Jameel et al. |
| 6,964,709 | B2 | 11/2005 | Matsumoto et al. |
| 7,017,500 | B2 | 3/2006 | Jones |

(56) References Cited

U.S. PATENT DOCUMENTS

| | | |
|---|---|---|
| 7,028,926 B2 | 4/2006 | Habib et al. |
| 7,055,209 B2 | 6/2006 | Zalewski |
| 7,204,208 B2 | 4/2007 | Johnson et al. |
| 7,267,134 B2 | 9/2007 | Hochstein, Jr. et al. |
| 7,341,067 B2 | 3/2008 | Jones et al. |
| 7,395,760 B2 | 7/2008 | Zilka et al. |
| 7,458,342 B2 | 12/2008 | Lefebvre et al. |
| 7,584,024 B2 | 9/2009 | Wroblewski et al. |
| 7,633,033 B2 | 12/2009 | Thomas et al. |
| 7,735,435 B2 | 6/2010 | Eriksson et al. |
| 8,381,690 B2 | 2/2013 | Jones |
| 9,091,182 B2 | 7/2015 | Labbe |
| 2002/0043192 A1 | 4/2002 | Philippe et al. |
| 2004/0006841 A1* | 1/2004 | Jameel ................ F28G 3/166 15/318.1 |
| 2004/0226758 A1 | 11/2004 | Jones et al. |
| 2005/0199743 A1* | 9/2005 | Hochstein, Jr. ....... B08B 7/0007 239/67 |
| 2005/0252458 A1 | 11/2005 | Saviharju et al. |
| 2006/0065291 A1* | 3/2006 | Jones ................ F22B 37/48 134/22.1 |
| 2006/0236696 A1 | 10/2006 | Saviharju et al. |
| 2009/0090311 A1 | 4/2009 | James et al. |
| 2009/0151656 A1 | 6/2009 | Jones |
| 2009/0229068 A1* | 9/2009 | Henderson ........... B08B 7/0007 15/316.1 |
| 2010/0064470 A1 | 3/2010 | Dahlen et al. |
| 2010/0077946 A1 | 4/2010 | D'Agostini |
| 2010/0101462 A1 | 4/2010 | Hayashi et al. |
| 2010/0107636 A1 | 5/2010 | Panchatsaram et al. |
| 2010/0199930 A1 | 8/2010 | Tandra |
| 2011/0011315 A1 | 1/2011 | Hayashi et al. |
| 2012/0270162 A1 | 10/2012 | Dahlhielm et al. |
| 2013/0152973 A1 | 6/2013 | Jones |
| 2014/0150825 A1 | 6/2014 | Mueller et al. |
| 2015/0253003 A1 | 9/2015 | Jones et al. |

FOREIGN PATENT DOCUMENTS

| | | |
|---|---|---|
| EP | 0602244 | 6/1994 |
| EP | 0905308 | 9/1998 |
| EP | 1063021 | 12/2000 |
| EP | 2784477 | 1/2014 |
| GB | 802032 | 9/1958 |
| GB | 1022254 | 9/1962 |
| GB | 1376805 | 12/1974 |
| GB | 2271440 | 4/1994 |
| GB | 2428312 | 1/2007 |
| JP | 62278217 | 12/1987 |
| JP | 10274408 | 10/1998 |
| JP | 2003156211 | 5/2003 |
| RU | 2054151 | 2/1996 |
| RU | 2143087 | 12/1999 |
| SU | 1291031 | 2/1987 |
| WO | 199305338 | 3/1993 |
| WO | 9827384 | 6/1998 |
| WO | 03104547 | 12/2003 |
| WO | 2006037018 | 4/2006 |
| WO | 2007028447 | 3/2007 |
| WO | 2008057039 | 5/2008 |
| WO | 2009139714 | 11/2009 |
| WO | 2010098946 | 9/2010 |
| WO | 2014068325 | 5/2014 |

* cited by examiner

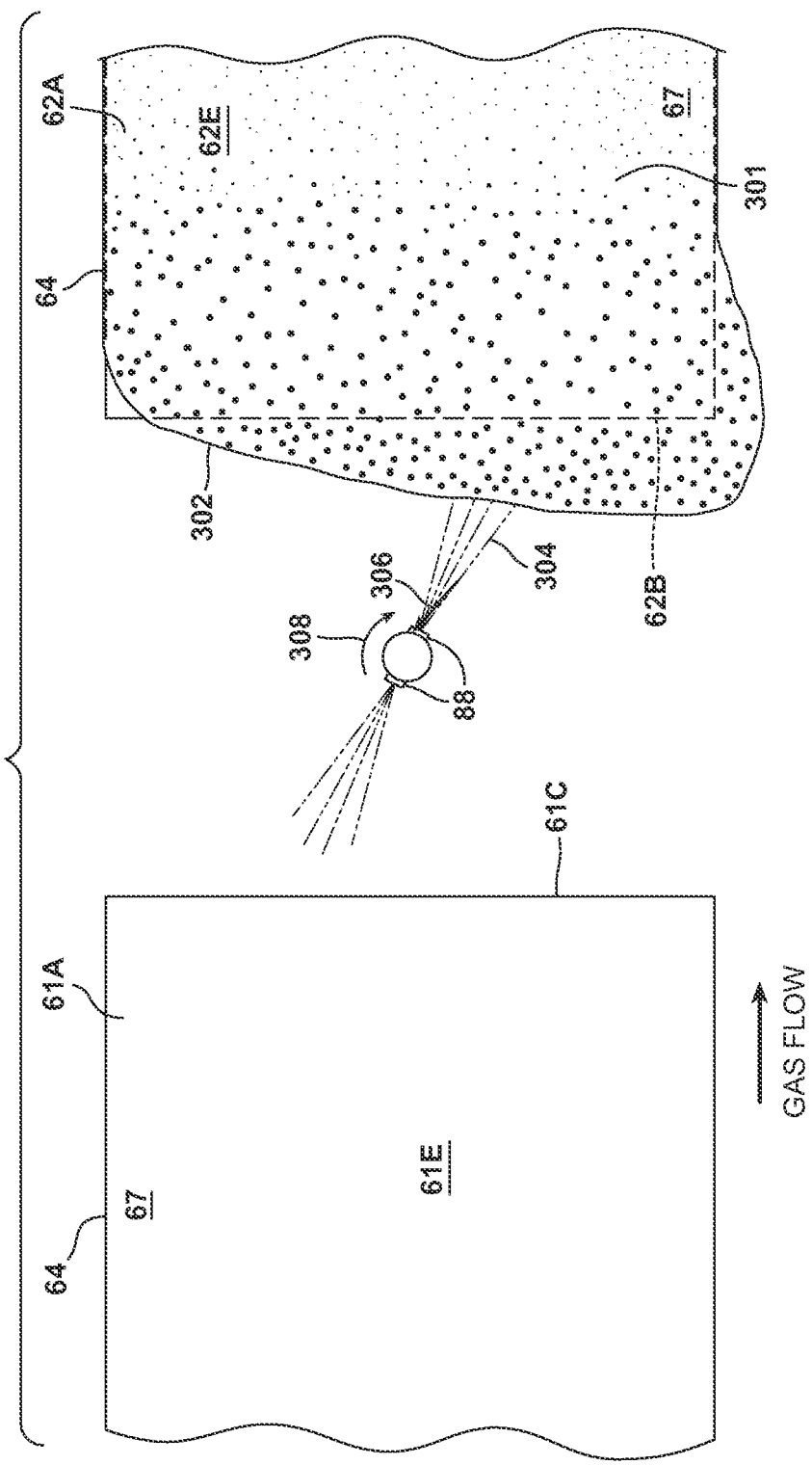

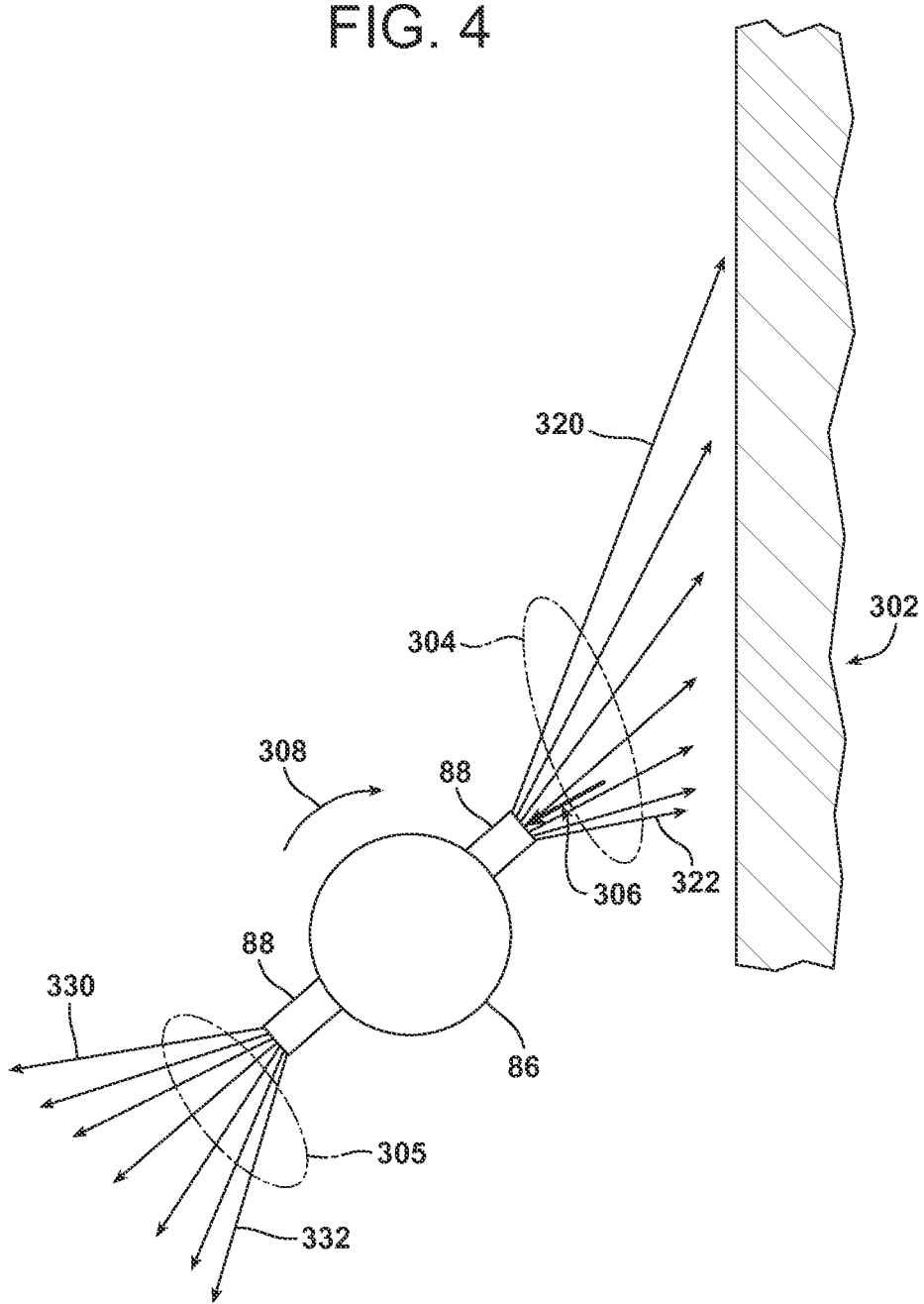

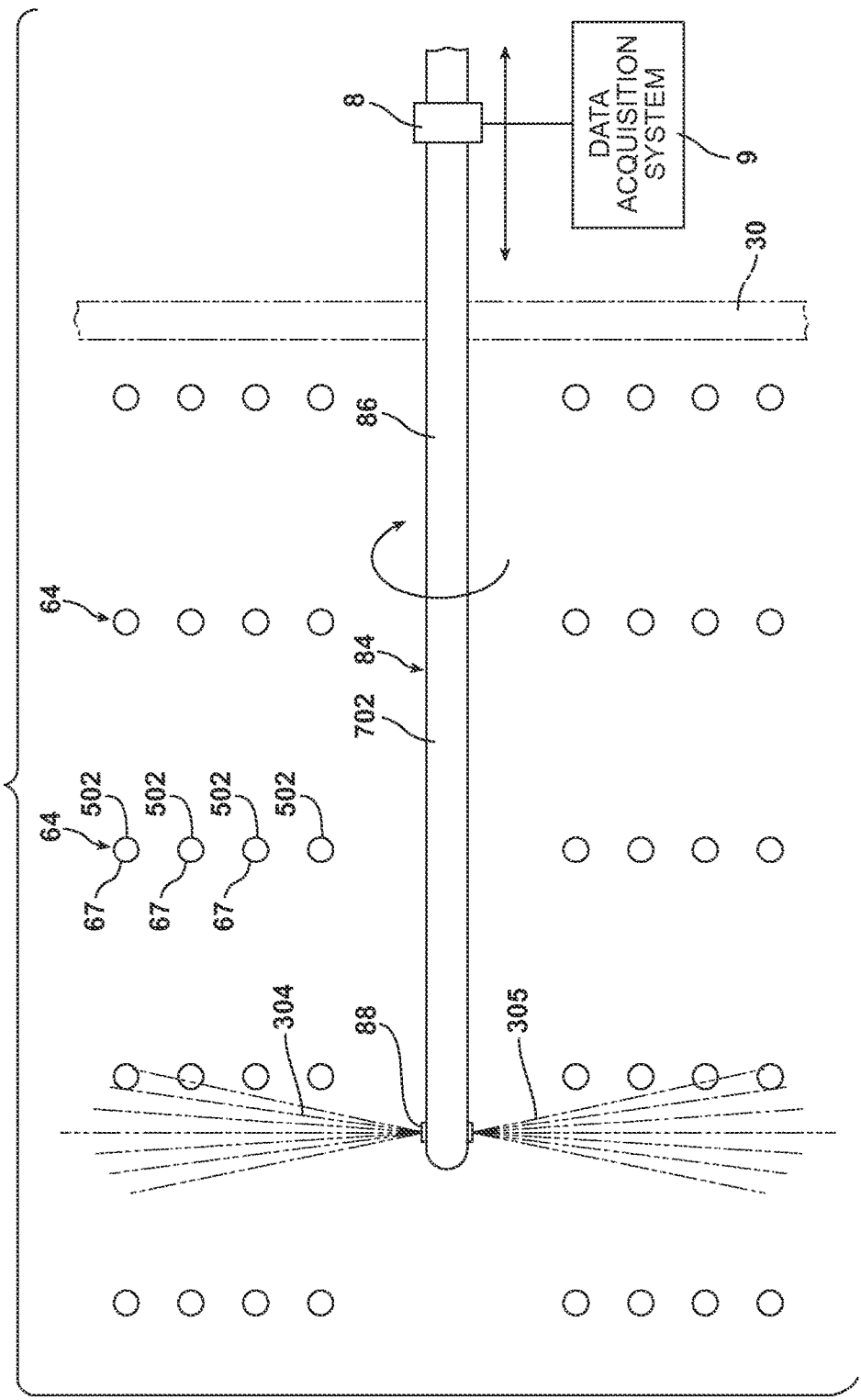

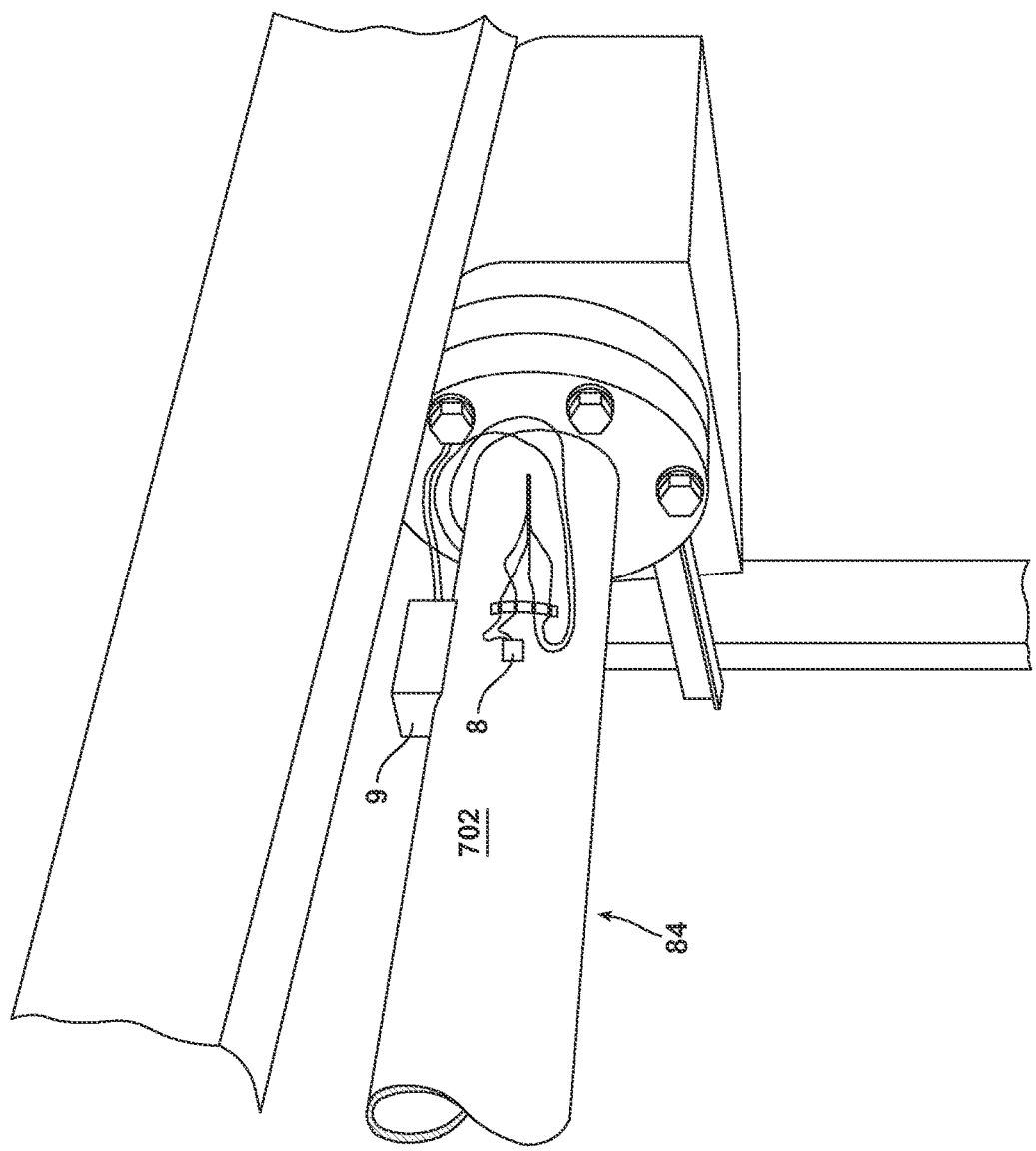

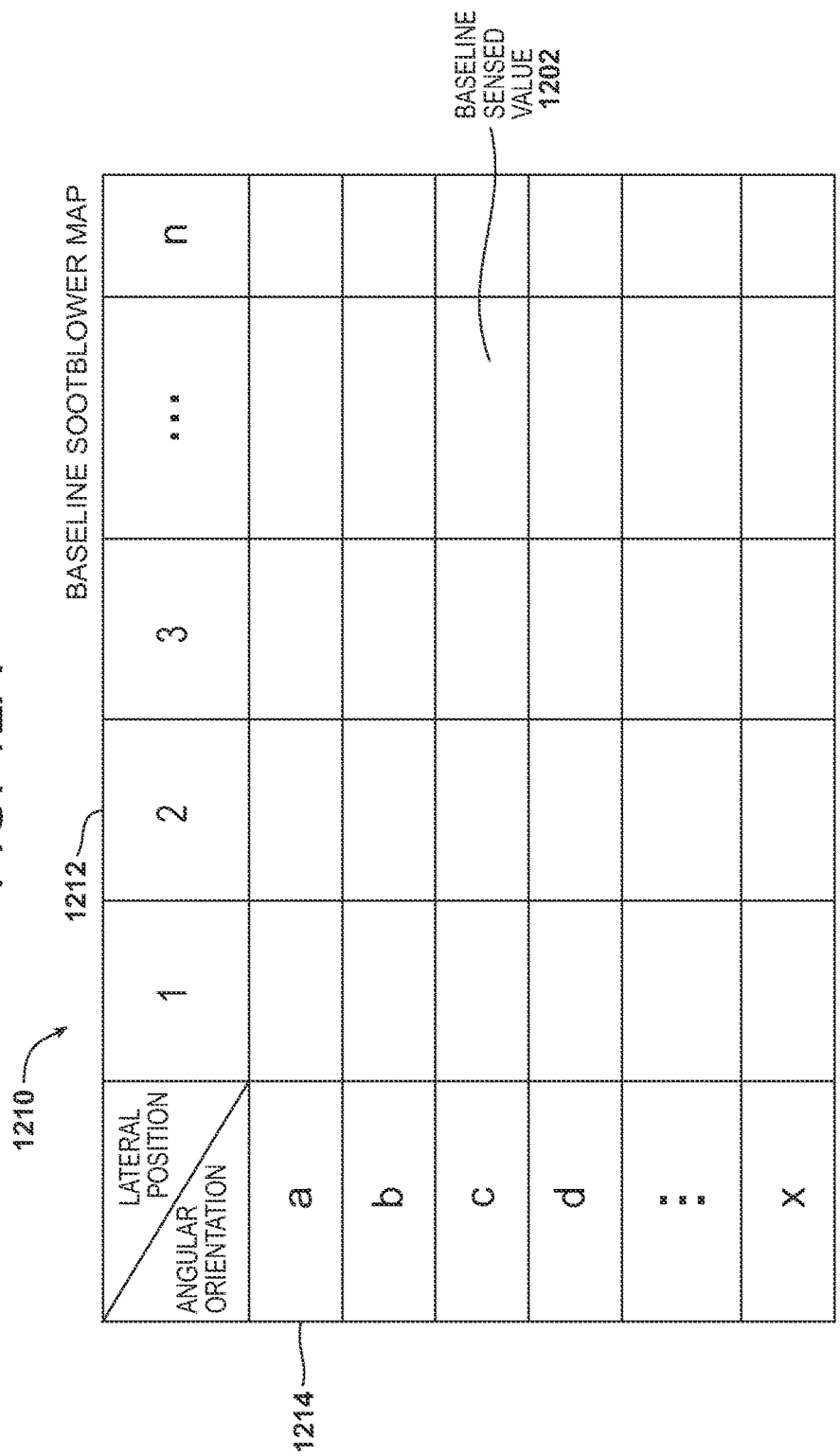

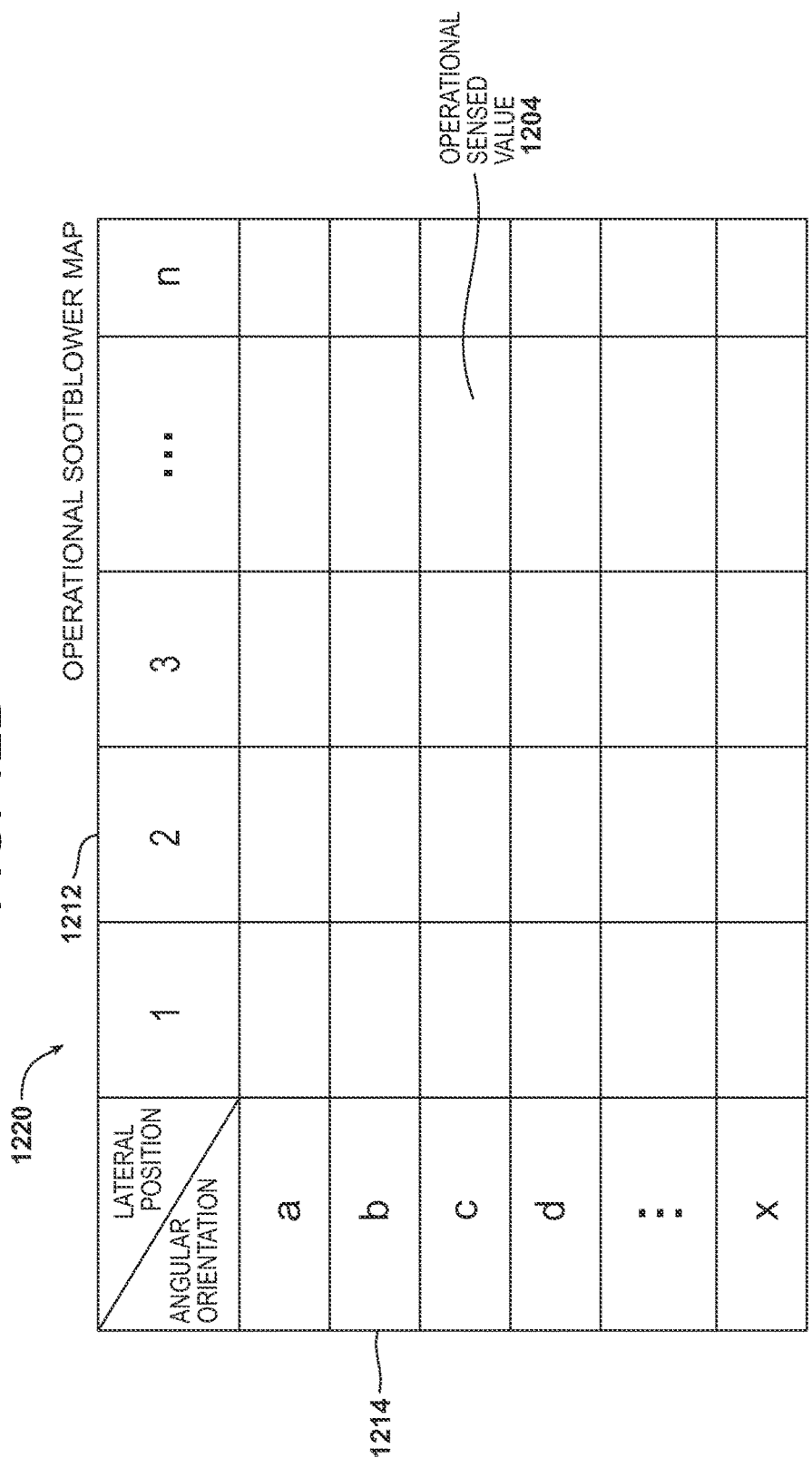

SYSTEM AND METHOD FOR DETERMINING A LOCATION OF FOULING ON BOILER HEAT TRANSFER SURFACE

FIELD

This invention relates generally to fouling or ash deposits in recovery boilers and, in particular, to detecting fouling ash deposits on heat exchangers of the recovery boilers via sootblowers.

BACKGROUND

In a paper-making process, chemical pulping yields, as a by-product, black liquor which contains almost all of the inorganic cooking chemicals along with the lignin and other organic matter separated from the wood during pulping in a digester. The black liquor is burned in a boiler. Two functions of the boiler are to recover the inorganic cooking chemicals used in the pulping process and to make use of the chemical energy in the organic portion of the black liquor to generate steam for a paper mill. As used herein, the term boiler can include either a bottom supported boiler or a top supported boiler that, as described below, burns a fuel which fouls heat transfer surfaces.

A Kraft boiler, for example, can include superheaters in a furnace that extract heat by radiation and convection from the furnace gases. Saturated steam enters the superheater section and superheated steam exits at a controlled temperature. The superheaters comprise an array of platens that are constructed of tubes for conducting and transferring heat. Superheater heat transfer surfaces are continually being fouled by ash that is being carried out of the furnace chamber. The amount of black liquor that can be burned in a Kraft boiler is often limited by the rate and extent of fouling on the surfaces of the superheater section. The fouling, including ash deposited on the superheater surfaces, reduces the heat absorbed from the liquor combustion, which can result in reduced exit steam temperatures from the superheaters.

Boiler shutdown for cleaning is sometimes required. For example, Kraft boilers are particularly prone to the problem of superheater fouling. One conventional method of removing ash deposits from the superheaters in Kraft boilers includes sootblowing. Sootblowing is a process that includes blowing deposited ashes off the superheaters (or other heat transfer surface that is fouled with ash deposits) with a blast of steam from nozzles of a sootblower. A sootblower has a lance for conducting the steam to the nozzles at a distal end of the lance. Sootblowing can be performed essentially continuously during normal boiler operation, with different sootblowers turned on at different times. Sootblowing is usually carried out using steam. The sootblowing procedure consumes a large amount of thermal energy produced by the boilers.

Conventional methods of determining the amount of deposit on superheater sections of recovery boilers are typically based on indirect measurements, such as the temperature increase of exhaust gas exiting the boiler, the temperature decrease of steam, heat transfer, enthalpy, or the pressure drop increase over the gas side (combustion section as opposed to the water/steam side) of the boiler. However, such techniques are unable to determine, or at least address, the location of the ash deposits on the heat exchangers of the recovery boilers. Accordingly, such techniques offer little guidance in providing a reliable and efficient sootblowing strategy that reduces steam consumption for energy savings or to improve heat transfer surface effectiveness.

SUMMARY

In accordance with a first aspect of the present invention, a method is provided for detecting fouling of a heat exchanger of a boiler. The method may comprise: emitting first and second sprays of pressurized fluid from first and second nozzles of a sootblower element; generating a value indicative of one or more reactive forces created by impact of one or both of the first and second pressurized fluid sprays on the heat exchanger or one or more substantial deposits on the heat exchanger and translated back to the sootblower element through one or both of the first and second sprays of the pressurized fluid; and determining when a substantial deposit is on the heat exchanger indicating fouling based on the value.

Each of the first and second sprays of pressurized fluid may comprise a subsonic stream of steam.

The one or more reactive forces may comprise one or more twisting forces exerted on the sootblower element.

The generated value may be based on a sensed value from a strain gauge sensing element arranged on the sootblower element to detect the sensed value.

The method may comprise: determining a linear position of the nozzles relative to a reference position; determining a rotational orientation of at least one of the nozzles relative to a reference orientation; determining whether one or more substantial deposits are on the heat exchanger surface based on the value and the linear position and rotational orientation of the nozzles; and if it is determined that one or more substantial deposits are on the heat exchanger, determining a particular pair of possible locations of the one or more substantial deposits on the heat exchanger based on the linear position and the rotational orientation of the nozzles.

Determining the linear position and the rotational orientation of the nozzles may be based on a period of time that has transpired since an initial time.

The method may comprise: moving the sootblower element from a first home position to a second maximum-in position in a direction substantially perpendicular to a plurality of platens of the heat exchanger; rotating the sootblower element around its longitudinal axis; and defining a plurality of different sootblower element alignments within the boiler, each defined by a corresponding linear position between the first home and second maximum-in positions and a rotational orientation of the sootblower element.

At each of the plurality of different sootblower element alignments within the boiler during boiler operation, a respective value may be generated indicative of the one or more reactive forces translated back to the sootblower element through one or both of the first and second sprays of the pressurized fluid emitted by the sootblower element when at that particular alignment.

The method may comprise constructing, for the sootblower element, a map that indicates whether at least one substantial deposit is located at at least one heat exchanger location corresponding to each of the plurality of different sootblower element alignments.

The method may comprise at each of the plurality of different sootblower element alignments, measuring a respective baseline value, each baseline value indicative of no fouling being present at that particular alignment.

Moving the sootblower element and rotating the sootblower element while measuring the respective baseline values may occur substantially at the same rate as when generating the respective values indicative of one or more reactive forces during boiler operation.

The method may comprise at each of the plurality of different sootblower element alignments determining when at least one substantial deposit is located at at least one of two possible locations of the heat exchanger corresponding to that particular sootblower element alignment based on a comparison between the generated respective value during boiler operation and the respective baseline value associated with that particular alignment.

The method may comprise: as the sootblower element is moving and rotating, at each of a plurality of different time instances, generating a respective value indicative of the one or more reactive forces exerted on the sootblower element through one or both of the first and second sprays of pressurized fluid for that particular time instance; and associating with each of the plurality of different time instances a corresponding one of the plurality of sootblower element alignments.

The method may comprise at each of the plurality of different sootblower element alignments, measuring a respective baseline value, each baseline value indicative of no fouling being present at that particular alignment.

The method may comprise transforming the plurality of generated values during boiler operation and the plurality of baseline values into respective first and second sets of frequency-domain data.

The method may comprise reviewing a plurality of frequency bands of the first and/or second sets of the frequency-domain data to identify a particular frequency band among the plurality of frequency bands, wherein the particular frequency band is more likely than any of the other frequency bands of the plurality to have a response that corresponds to the generated respective values.

The method may comprise transforming the frequency-domain data of the identified frequency band for both the first and second sets of frequency-domain data into corresponding first and second sets of time domain data, wherein each element of the first and second sets of the time domain data is defined by an associated one of the plurality of different time instances and an associated amplitude value.

Each element of the time domain data of the first set may be associated with a respective corresponding element in the second set of the time domain data.

The method may comprise for each pair of corresponding elements of the first and second sets of time domain data determining when one or more substantial deposits are on the heat exchanger based on a comparison between the associated amplitude value of the element of the first set of time domain data and the corresponding element of the second set of the time domain data.

In accordance with a second aspect of the present invention, a method is provided for detecting fouling of a heat exchanger of a boiler. The method may comprise: emitting a spray of pressurized fluid from a nozzle of a sootblower element; generating a value indicative of a reactive force created by an impact of the pressurized fluid on the surface of the heat exchanger or a substantial deposit on the heat exchanger surface and translated back to the sootblower element through the spray of the pressurized fluid; and determining when a substantial deposit is on the surface of the heat exchanger indicating fouling based on the value indicative of the reactive force.

In accordance with a third aspect of the present invention, a computer program product is provided for detecting fouling of a heat exchanger of a boiler with a sootblower element which emits first and second sprays of pressurized fluid from first and second nozzles. The computer program product can include a non-transitory computer readable storage medium having computer readable program code embodied therewith. In particular the computer readable program code may include a) computer readable program code to generate a value indicative of one or more reactive forces created by impact of one or both of the first and second pressurized fluid sprays on the heat exchanger or one or more substantial deposits on the heat exchanger and translated back to the sootblower element through one or both of the first and second sprays of the pressurized fluid; and b) computer readable program code to determine when a substantial deposit is on the heat exchanger indicating fouling based on the generated value.

In accordance with a fourth aspect of the present invention, a system is provided for detecting fouling of a heat exchanger of a boiler with a sootblower element which emits first and second sprays of pressurized fluid from first and second nozzles. The system may include a data acquisition system to generate a value indicative of one or more reactive forces created by impact of one or both of the first and second pressurized fluid sprays on the heat exchanger or one or more substantial deposits on the heat exchanger and translated back to the sootblower element through one or both of the first and second sprays of the pressurized fluid. The data acquisition system may also determine when a substantial deposit is on the heat exchanger indicating fouling based on the generated value.

A data acquisition system and a control system, as described herein, may comprise any kind of a computer which receives input data, processes that data through computer instructions, and generates output data. Such a computer can be a hand-held device, laptop or notebook computer, desktop computer, microcomputer, digital signal processor (DSP), mainframe, server, cell phone, personal digital assistant, other programmable computer devices, or any combination thereof. Such computers can also be implemented using programmable logic devices such as field programmable gate arrays (FPGAs) or, alternatively, realized as application specific integrated circuits (ASICs) or similar devices. The term "computer" is also intended to encompass a combination of two or more of the above recited devices, e.g., two or more microcomputers. Such computers may be connected wirelessly or hard-wired to one another. It is also contemplated that the data acquisition system and the control system may be combined as a single computer. Accordingly, aspects of the present invention may be implemented entirely as hardware, entirely as software (including firmware, resident software, micro-code, etc.) or in a combined software and hardware implementation that may all generally be referred to herein as a "circuit," "module," "component," or "system." Furthermore, aspects of the present invention may take the form of a computer program product embodied in one or more computer readable media having computer readable program code embodied thereon.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements.

FIG. 3A is a diagrammatical illustration of a relative position of a pattern of an impinging steam jet of lance onto a deposit formed on a heat exchanger's surface to produce a torque, in accordance with the principles of the present invention;

FIG. 4 diagrammatically illustrates how a reactive force is generated at a nozzle of a sootblower lance 86, in accordance with the principles of the present invention;

FIG. 5 is similar to FIG. 3B but each platen is depicted as a plurality of tubes;

FIG. 6 is an illustration of a portion of a sootblower lance with a torque-related measurement device including a data acquisition system installed thereon, in accordance with the principles of the present invention;

FIGS. 12A-12C depict different maps associating sensed torque-related values with particular sootblower element alignments in accordance with the principles of the present invention

DETAILED DESCRIPTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
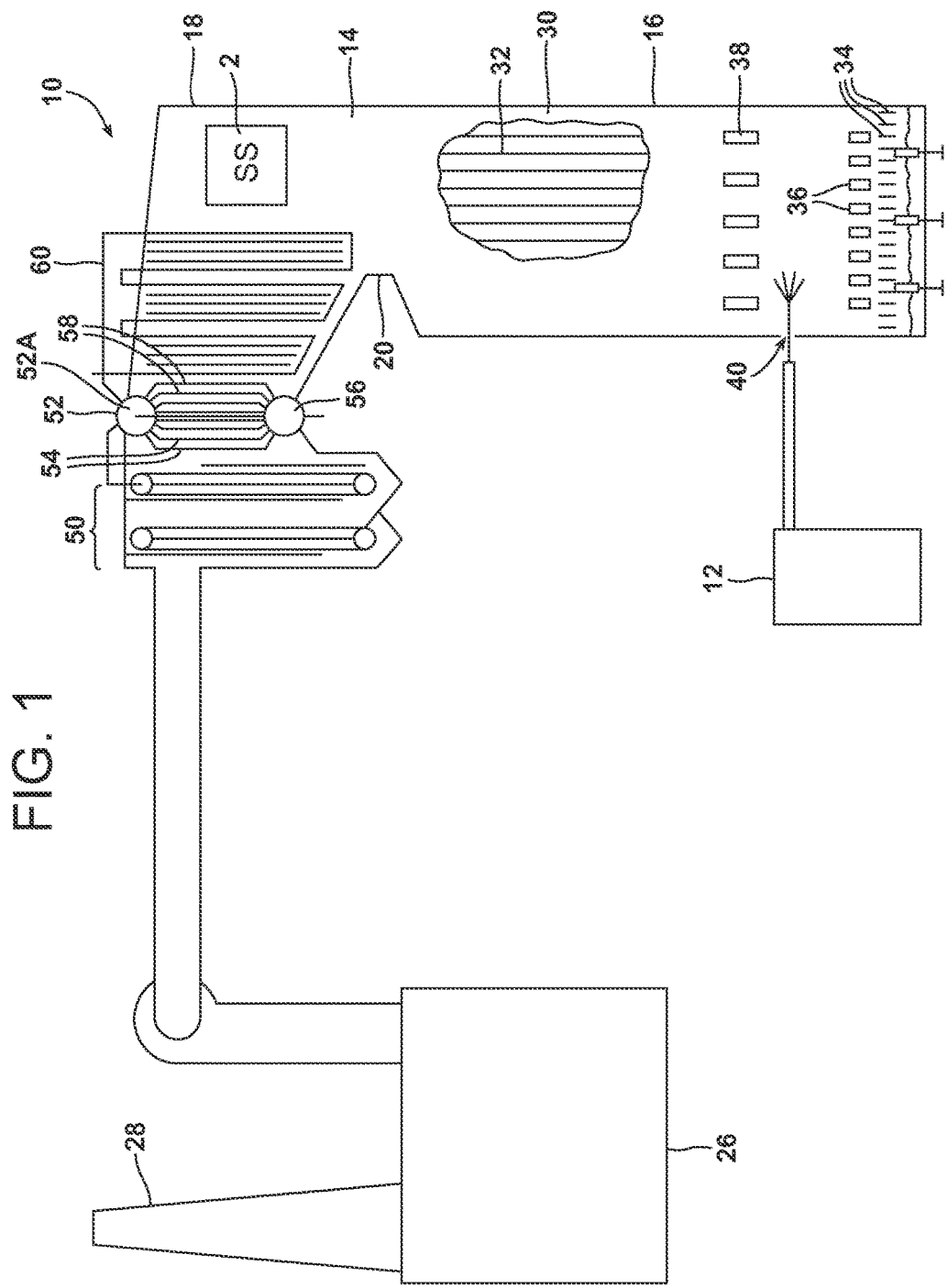
FIG. 1 is a schematic illustration of a typical recovery boiler system having one or more sootblowers for detecting fouling on heat exchangers' surfaces of the recovery boilers in accordance with the principles of the present invention.

FIG. 1 is a schematic illustration of a Kraft black liquor recovery boiler system 10 having a sootblower system 2 with one or more sootblowers (also referred to herein as "sootblower elements"), however, other boiler systems with various sootblower systems and its ancillary devices are within the scope of the present invention. A Kraft black liquor boiler system having a plurality of sootblowers is disclosed and described in U.S. Patent Application Publication No. 2006/0065291 A1, published on Mar. 30, 2006, and entitled "Method of Determining Individual Sootblower Effectiveness," which is incorporated herein by reference. Any suitable sootblower may be used in embodiments of the present invention, including sootblowers of any cross-section employing any mechanism to reduce deposits on heat exchanger surfaces.

Black liquor is a by-product of chemical pulping in a paper-making process and which is burned in the recovery boiler system 10. The initial concentration of "weak black liquor" is about 15%. The black liquor is concentrated to firing conditions (65% to 85% dry solids content) in an evaporator 12, and then burned in the recovery boiler system 10. The evaporator 12 receives the weak black liquor from washers (not shown) downstream from a cooking digester (not shown).

The recovery boiler system 10 comprises a recovery boiler 14 comprising a sealed housing defining a furnace 16 where the black liquor is burned to generate hot working gases, a heat transfer section 18, and a bullnose 20 in between the furnace 16 and the heat transfer section 18, see FIG. 1. The boiler system 10 further comprises an economizer 50, a boiler bank 52 and a superheater section 60, all of which are located in the heat transfer section 18, see FIG. 1. The hot working gases including ash resulting from the burning of the fuel in the furnace 16 pass around the bullnose 20, travel into and through the heat transfer section 18, are then filtered through an electrostatic precipitator 26 and exit through a stack 28, see FIG. 1.

Vertically aligned wall tubes 32 are incorporated into vertical walls 30 of the furnace 16. As will be discussed further below, a fluid, primarily water, passes through the wall tubes 32 such that energy in the form of heat from the hot working gases generated in the furnace 16 is transferred to the fluid flowing through the wall tubes 32. The furnace 16 has primary level air ports 34, secondary level air ports 36, and tertiary level air ports 38 for introducing air for combustion at three different height levels. Black liquor is sprayed into the furnace 16 out of spray guns 40. The black liquor is supplied to the guns 40 from the evaporator 12.

The economizer 50 receives feedwater from a supply. In the illustrated embodiment, the feedwater may be supplied to the economizer 50 at a temperature of about 250° F. The economizer 50 may heat the water to a temperature of about 450° F. The hot working gases moving through the heat transfer section 18 supply energy in the form of heat to the economizer 50 for heating the feedwater. The heated water is then supplied from the economizer 5 to a top drum (steam drum) 52A of the boiler bank 52, see FIG. 1. The top drum 52A functions generally as a steam-water separator. In the embodiment illustrated in FIG. 1, the water flows down a first set of tubes 54 extending from the top drum 52A to a lower drum (mud drum) 56. As the water flows down the tubes 54, it may be heated to a temperature of about 400-600° F. From the lower drum 56, a portion of the heated water flows through a second set of tubes 58 in the boiler bank 52 to the upper drum 52A. A remaining portion of the heated water in the lower drum 56 is supplied to the wall tubes 32 in the furnace 16. The water flowing through the second set of tubes 58 in the boiler bank 52 and the wall tubes 32 in the furnace 16 may be heated to a saturated state. In the saturated state, the fluid is mainly a liquid, but some steam may be provided. The fluid in the wall tubes 32 is returned to the boiler bank 52 at the top drum 52A. The steam is separated from the liquid in the top drum 52A. The steam in the top drum 52A is supplied to the superheater section 60, while the water returns to the lower drum 56 via the first set of tubes 54.

Figure 2:
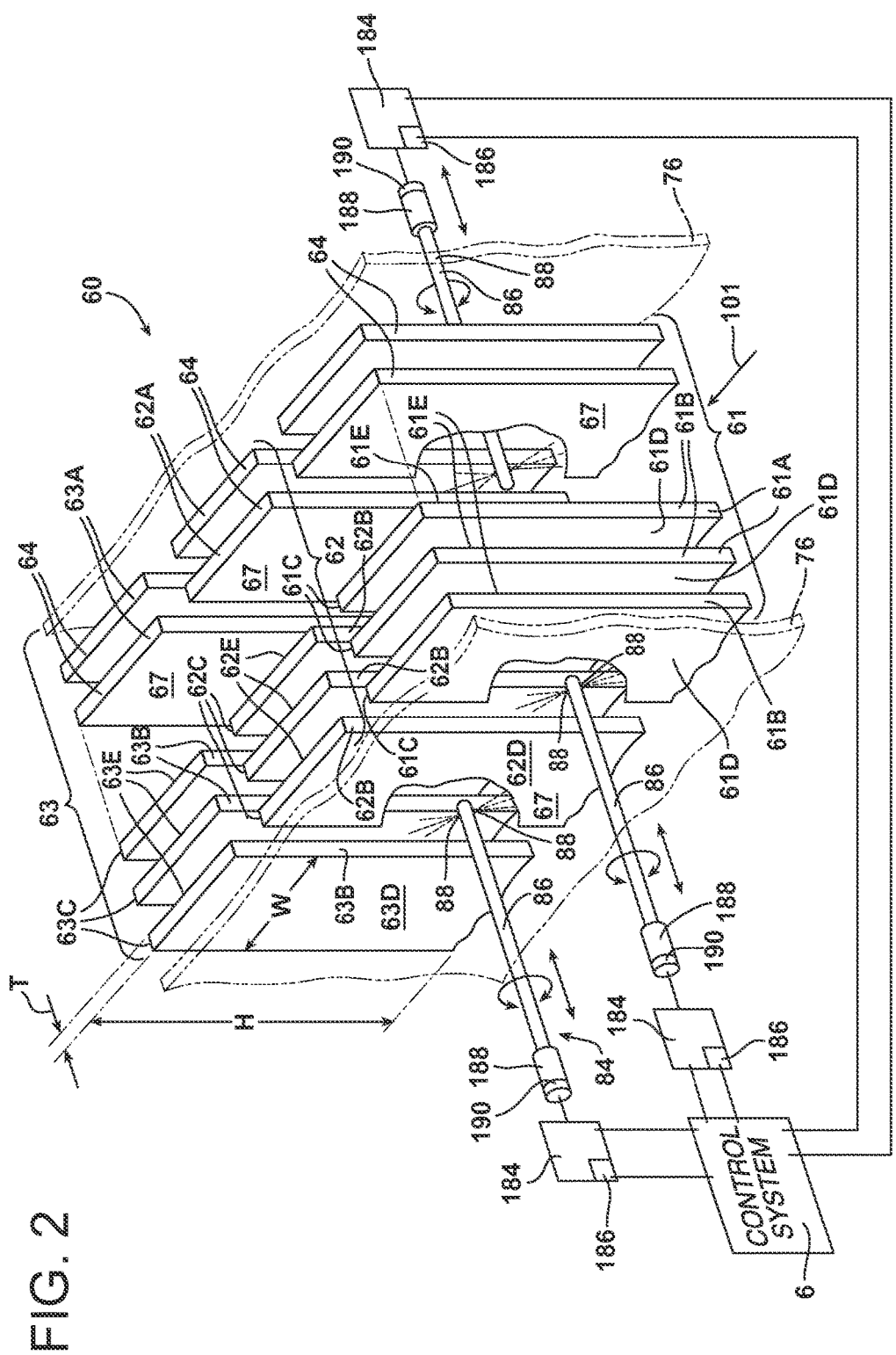
FIG. 2 is an enlarged top perspective view of a portion of the recovery boiler system shown in FIG. 1 illustrating a number of sootblowers being positioned within a number of superheater platens in accordance with the principles of the present invention.

In the embodiment illustrated in FIG. 2, the superheater section 60 comprises first, second and third superheaters 61, 62 and 63, each of which may comprise between about 20-50 heat transfer elements 64 comprising platens 61A, 62A and 63A. "Heat exchanger," as used herein, includes a superheater 61, 62, 63 as well as other devices through which heat from hot gases is transferred to a fluid, such as water. The platens 61A, 62A and 63A comprise tubes but are illustrated schematically in FIG. 2 as rectangular structures. Steam enters the platens 61A, 62A and 63A through a corresponding manifold tube called an inlet header (not shown), is superheated within the platens 61A, 62A and 63A, and exits the platens 61A, 62A and 63A as superheated steam through another manifold tube called an outlet header (not shown). The platens 61A, 62A and 63A can, for example, be suspended from the headers (not shown). The hot working gases moving through the heat transfer section 18 supply the energy in the form of heat to the superheater section 60 for superheating the steam. In the embodiment illustrated in FIG. 2, the hot working gases move in the direction of arrow 101. It is contemplated that the superheater section 60 may comprise less than three superheaters or more than three superheaters.

An outer surface, or heat transfer surface 67, of each heat transfer element 64 is exposed to the interior of the furnace 16. While each heat transfer surface 67 is illustrated in FIG. 2 as a planar surface, because each heat transfer element 64 comprises tubes, the heat transfer surface 67 is defined by the outer surfaces of the tubes comprising that heat transfer element 64. All or a significant portion of the heat transfer surface 67 of each heat transfer element 64 may become coated with ash during normal operation of the furnace 16. So as to improve the efficiency of operation of the heat transfer elements 64, a substantial portion of the heat transfer surfaces 67 of those elements 64 may be cleaned by the sootblower system 2 so as to remove ash coated thereon.

Because the hot working gases move through the superheater section 60 in the direction of arrow 101, shown in FIG. 2, front edges 61B, 62B and 63B are exposed to a greater quantity of ash than opposing back edges 61C, 62C and 63C and, hence, the front edges 61B, 62B and 63B are generally coated with a greater quantity of ash than the back edges 61C, 62C and 63C. As explained in more detail below, because the hot working gases flow in the direction of arrow 101, this affects how deposits accumulate on front and rear surfaces 61D-63D and 61E-63E of the platens 61A, 62A and 63A. The thickness of each platen 61A-63A is denoted by "T" in FIG. 2. The heat transfer surface 67 of each heat transfer element 64, i.e., each platen 61A-63A, comprises respective front and back edges 61B-63B and 61C-63C and respective front and rear surfaces 61D-63D and 61E-63E.

As noted above, the sootblower system 2 comprises one or more sootblowers 84. A sootblower 84 is also referred to herein as a "sootblower element." The sootblowers 84 function to clean, i.e., remove ash and the like from, the heat transfer surfaces 67 of the heat transfer elements 64. Each sootblower 84 may comprise an elongated tube, or lance, 86 having at least one nozzle 88, and, typically, a pair of radial nozzles 88 about 180 degrees apart at a distal end of the lance 86, see FIG. 2. The nozzles 88 define sootblower nozzles. The lances 86 are in fluid communication with a steam (or water) source (not shown). Preferably, the steam is supplied at a pressure of between about 100 to 400 psi.

A linear drive device 184 may be coupled to each sootblower 84 for causing the sootblower 84 to move from a first home position, which may be outside of the boiler 14, to a second maximum-in position, where the sootblower 84 is positioned within the superheater section 60. A linear encoder 186 may form part of or is coupled to the linear drive device 184 or is coupled directly to the sootblower 84 to determine a linear position of the sootblower 84 relative to a reference position, such as a home location. A rotary drive device 188 may also be coupled to each sootblower 84 for causing the sootblower 84 to rotate relative to a reference orientation or angular position, such as a home 0 degree position, as it moves from its first home linear position to its second maximum-in position. A rotary encoder 190 may form part of or is coupled to the rotary drive device 188 or is coupled directly to the sootblower 84 to determine a rotational orientation or angular position of the sootblower 84 relative to the home angular position. The linear drive devices 184 and the rotary drive devices 188 are coupled to a control system 6 for controlling the operation of the devices 184, 188. The linear encoders 186 and the rotary encoders 190 are coupled to the control system 6, such that the control system 6 receives data generated by the encoders 186 and 190 corresponding to the sensed linear positions and angular positions of the sootblowers 84. The inward motion of each sootblower 84, between the first and second positions, is called a first stroke and the outward motion, between the second position and the first position, is called the second stroke.

As shown on FIG. 2, the sootblowers 84 may move generally perpendicular to a height "H" and width "W" of the heat transfer elements 64, and in between ones of the heat transfer elements 64. As the sootblowers 84 move between their first and second positions, steam is expelled via the nozzles 88. As the steam contacts the ash coated on the heat transfer surfaces 67, a portion of the ash is removed. Over time, the build-up of residual ash may become too resilient to be removed by the sootblowers 84 and an alternate cleaning method may be used. The sootblowers 84 described above utilize steam and/or water; it is noted however, that the embodiments of the present invention are not so limited and the sootblowers may also be based on another principle, such as acoustic sootblowing or another principle enabling sootblowing while the boiler 14 is being used.

FIG. 3A is a diagrammatical illustration of relative positions of steam jets from a sootblower 84 impinging onto an ash deposit formed on a heat transfer surface 67 of a heat transfer element 64. In particular, the view of FIG. 3A is of the rear surface 62E and front edge 62B of a platen 62A and the rear surface 61E and back edge 61C of an adjacent platen 61A. Because of the direction of the flow of gases with ash and other material, the gases tend to strike the front edge 62B and form a deposit 302 on that edge. The gases tend to flow across the front and rear surfaces 61D and 61E of the platen 61A and not directly strike the back edge 61C so little or no deposit forms on the back edge 61C. As shown, the deposit 302 can be heavier or greater nearer to the bottom of the front edge 62B as compared to the upper region of the front edge 62B. The speckling 301 of FIG. 3A is meant to illustrate that the deposit 302 tends to become thinner or less as the distance from front edge 62B, along the platen surfaces 62D and 62E becomes greater.

In FIG. 3A, the nozzles 88 of the sootblower 84 travel out of and into the plane of the paper. While traveling out of the plane of the paper, the sootblower lance 86 may be rotated such that the nozzles 88 and the emitted steam jets rotate in a clockwise direction 308. If fouling, i.e., a substantial ash deposit 302, is located on a heat transfer surface 67 of a heat transfer element 64, as illustrated on the front edge 62B and the front and rear surfaces 62D and 62E of a platen 62A in FIG. 3A, then the spray of steam 304 emitted from one of the nozzles 88 will impinge upon that deposit 302. As explained in more detail below with respect to FIG. 4, the impact of the pressurized fluid comprising the spray of steam 304 on the deposit 302 causes a reactive force 306 which is translated back to the nozzle area of the sootblower lance 86 through the spray of the steam 304. The reactive force 306 translated back to the sootblower lance 86 may be experienced by the sootblower lance 86 as a reactive torque, which is opposite to the direction of rotation 308. In some embodiments, a velocity of the steam 304 may play a role in how effectively the reactive force is translated back to the sootblower lance 86. For example, a subsonic steam stream may translate back the reactive force with greater amplitude than a supersonic steam stream.

Figure 3B:
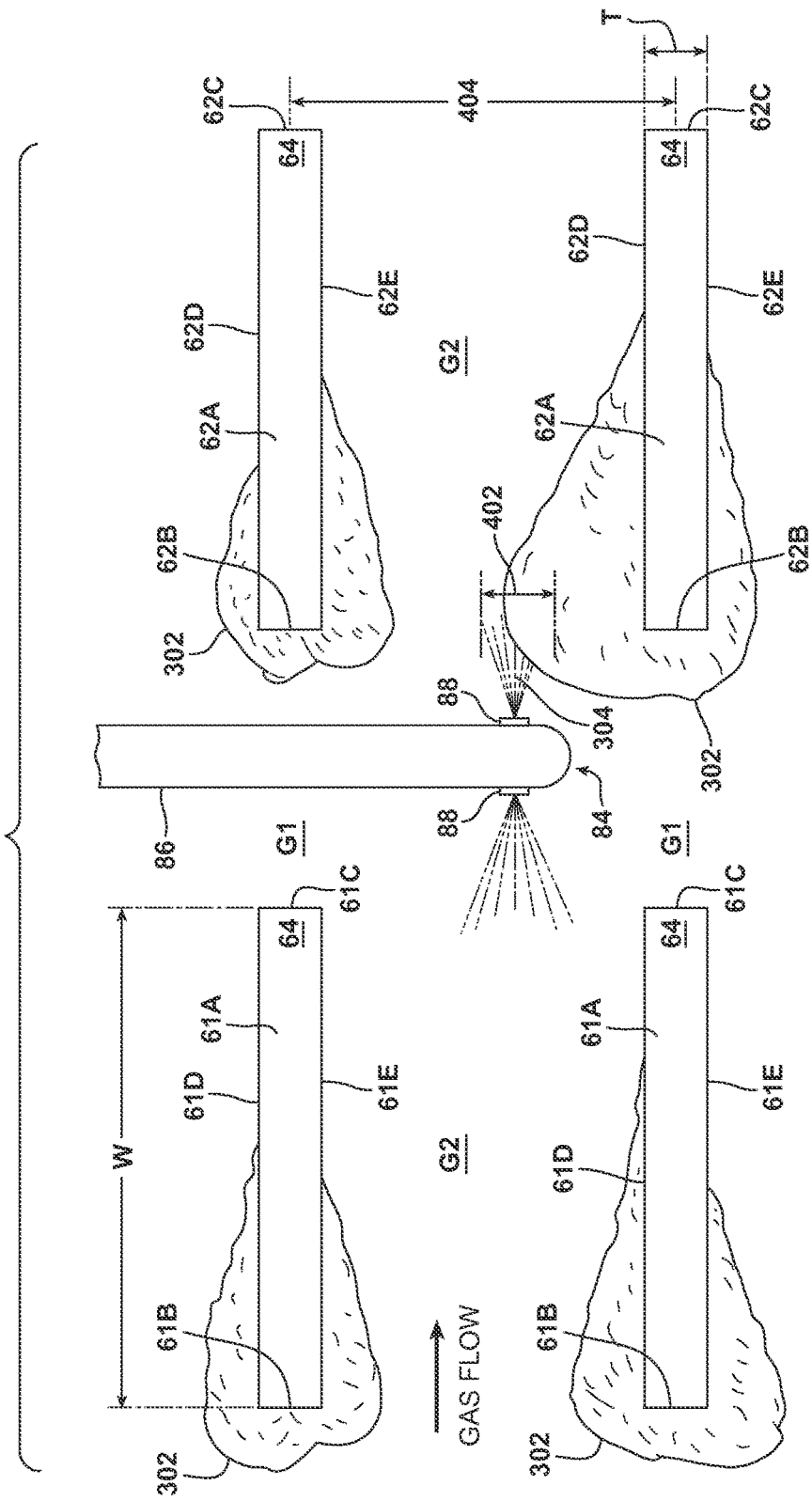
FIG. 3B is a top view of four adjacent platens with fouling present, in accordance with the principles of the present invention.

FIG. 3B illustrates a top view of four adjacent platens 61A, 62A having fouling present. As shown, the deposits 302 can typically form on a "leading" edge (e.g., front edge 61B, 62B) of a platen 64 with less deposit mass present nearer the "trailing" edge (e.g., back edge 61C, 62C) of the platen. Each deposit 302 can form on both the front surface 61D, 62D and rear surface 61E, 62E of the platen 64. Thus the deposit 302 can grow outwardly in the gap $G_1$ between adjacent back and front edges 61C and 62B of adjacent platens 64 and also grow outwardly in a gap $G_2$ between adjacent rear and front surfaces 61E, 61D and 62E, 62D of adjacent platens 64.

In FIG. 3B, an example steam jet spray pattern 402 is shown to illustrate how the spray pattern 402 may occur in a region between two heat transfer elements 64. The heat transfer elements 64 may be spaced apart a distance 404 comprising about 1 foot between centers of adjacent heat transfer elements 64. Between 20 to 50 heat transfer elements 64 may be encountered by a sootblower 84 while the sootblower 84 travels from its home position to its maximum-in position. Each heat transfer element 64 can have a thickness T from about 2 inches to about 2.5 inches. Travel of a sootblower 86 through full first and second strokes can take about 90 to 120 seconds. As an example, 20 heat transfer elements 64 will cover a span of about 20 feet. If the sootblower 86 is traveling at a speed to cover that span in 120 seconds, then nozzles 88 of the sootblower 86 will travel at a speed of about 2 inches/sec and will take about 5.0 seconds to travel approximately 10 inches between two adjacent heat transfer elements 64. If the nozzles 88 of the sootblower 84 are rotated at a speed of between 0.5 to 1.0 Hz, then the nozzles 88 can rotate through a full 360 degrees while in-between two adjacent heat transfer elements 64. One of ordinary skill will recognize that the linear speed of the sootblower 84, the rotational speed of the sootblower nozzles 88, and the spacing between adjacent heat transfer elements 64 can be selected to determine and control how the spray pattern 402 will interact with various portions of the heat transfer surfaces 67 of the heat transfer elements 64.

FIG. 4 diagrammatically illustrates how a reactive force is generated at a nozzle 88 when positioned as shown in FIGS. 3A and 3B. The spray 304 of steam from one of the nozzles 88 strikes the deposit 302. However, if the stream 304 is considered to be comprised of discrete stream elements, then a lower discrete stream element 322 travels less distance than an upper discrete stream element 320 when striking the same deposit 302. Because of this difference in distances, a force created in reaction to the discrete stream element 322 striking the deposit 302 will be greater than a force created in reaction to the discrete stream element 320 striking the deposit 302. In the total reactive force 306 generated by the stream 304 striking the deposit 302, a contribution from discrete stream element 322 will be greater than a contribution from discrete stream element 320. Thus, the reactive force 306 that is translated back to the nozzle 88 through the stream 304 is not perpendicular to an outer circular surface of the lance 86, does not pass through a center axis of the lance 86 and exerts a twisting force on the sootblower lance 86.

The left side of FIG. 4 shows no reactive force as the spray 305 does not strike a deposit or any portion of the back edge 61C of the adjacent platen 61A.

It is noted that a reactive force that is perpendicular to the surface of the lance 86 and extends through a center of the lance 86 may occur if a stream strikes a platen surface 67 or substantial deposit 302 and is substantially perpendicular to the surface that the spray is striking FIG. 5 is similar to FIG. 3B but each heat transfer element 64 is depicted as a plurality of tubes 502. In FIG. 5, each heat transfer element 64 is shown as comprising multiple tubes 502, which extend into and out-of the plane of the paper. The outside surfaces of the tubes 502 defining a heat transfer element 64 comprise the heat transfer surface 67 for that heat transfer element 64.

FIG. 5 also shows one or more strain gauges defining a strain gauge sensing element 8 attached to the lance 86 of the sootblower 84. In the illustrated embodiment, a respective strain gauge sensing element 8 is preferably attached to each individual sootblowers 84 but, alternatively, a strain gauge sensing element 8 may be provided for fewer than all of the sootblowers 84. The strain gauge sensing element 8 may be coupled with and communicate data to a data acquisition system (DAS) 9, which, in turn, may communicate with the control system 6. The strain gauge sensing element 8 and the DAS 9 measure and monitor twisting reactive forces or reactive torques applied to the sootblower 84. However, as one of ordinary skill in the art would appreciate, the reactive force may be any of the following: a bending force, a shear force, a tangential force or a radial force In FIG. 5, there is no fouling or deposits on any of the heat transfer elements 64. However, even under these circumstances the strain gauges 8 are believed to sense strain values resulting from reactively induced forces as steam jets 304 and 305 strike the surfaces of the various tubes 502 as the sootblower 84 is being moved in and out relative to a furnace wall 30. As discussed more fully below, one or more complete first and second strokes (e.g., 10 passes) of the sootblower 84 could be performed while collecting data sensed by the strain gauge sensing element 8 and communicated to the DAS 9. This data could be considered a baseline condition and represent what reactive forces a sootblower 84 might encounter during operation even in the absence of any fouling or ash deposits on the heat transfer surfaces 67 of the heat transfer elements 64.

After operation of the boiler for a period of time, substantial ash deposits, or fouling, can build up on the surfaces of the tubes 502 (see for example FIG. 3B). Thus, if the tubes 502 in FIG. 5 also include fouling, then ash deposits can be encountered by steam jets 304 and 305 as their sootblower 84 moves linearly and rotationally. Thus, at least one of the steam jets 304 and 305 may strike a deposit (e.g., 302) while its corresponding nozzle 88 is in one or more lateral or linear positions and the one steam jet 304, 305 may also strike that deposit while its corresponding nozzle 88 is in one or more different angular orientations as the sootblower 84 also rotates during the lateral movement. The movement of the sootblower 84 can be described as moving the sootblower 84 from its first home position to its second maximum-in position in a direction substantially perpendicular to a plurality of the heat transfer elements 64 of one or more of the superheaters 61, 62 and 63 and rotating the sootblower nozzles 88 around the sootblower's longitudinal axis. If this movement is broken into discrete steps, then a plurality of different sootblower nozzle alignments (also referred to herein as "sootblower alignments") within the boiler 14 can be defined, such that each alignment is defined by a corresponding linear position of the sootblower nozzles 88 between the first home and second maximum-in positions and a rotational orientation or angular position of the sootblower nozzles 88 relative to a reference position, i.e., a home zero position. Since the nozzles 88 are located a fixed angular distance from one another, e.g., 180 degrees, each alignment may be defined with regards to one of the two nozzles 88 relative to the home zero position or a predefined angular location on the sootblower lance 86 relative to the home zero position. To collect reactive force-related data for a given sootblower 84, at each of the plurality of different sootblower alignments within the boiler 14 during boiler operation, the strain gauge sensing element 8 can sense a respective strain value related to the reactive force(s) translated back to the sootblower 84 through one or both of the sprays 304, 305 of the pressurized fluid emitted by the sootblower nozzles 88 when at each particular alignment. These strain values can be communicated to the DAS 9 which can then generate a corresponding value, based on the sensed strain value, which is indicative of the reactive force(s) translated back to the sootblower 84. Since, in the illustrated embodiment, the nozzles 88 are spaced 180 degrees apart, it may not be possible to determine through which of the two sprays emitted by the two nozzles 88 the reactive force(s) is translated back through to the sootblower 84

The surface 702 of a sootblower lance 86, see FIG. 5, may experience compression and tension when under torque. In one example, the strain gauge sensing element 8 comprises pairs of strain gauge elements located on the surface 702 of the lance 86. One pair may measure an increase in length in the direction in which the surface is under tension and the other pair may measure a decrease in length in the direction in which the surface is under compression. One conventional strain gauge sensing element of this nature employs a Wheatstone bridge configuration of the strain gauge pairs; however, other configurations are contemplated as well. A strain gauge transforms strain applied to the surface 702 of the sootblower lance 86 into a proportional change of resistance. Thus, the strain gauge sensing element 8 senses and generates a voltage proportional to strain, e.g., a strain value, that results from one or more reactive forces created by impact of one or more steam sprays, or jets, 304, 305 on one or more surfaces 67 of one or more heat transfer elements 64 and translated back to the sootblower lance 86 through the one or more steam sprays 304, 305. Typically, the strain gauge sensing element 8 will measure a strain value in units of "microstrain"; wherein, one microstrain is a strain value of 1 µm/m. In addition to the described strain gauges, a reactive force on a sootblower lance 86, such as a reactive torque, can also be measured by stationary proximity sensors, magnetorestrictive sensors, magnetoelastic sensors, fiber-optic sensor, a motor current of a rotary drive device 188 and a variety of other techniques without departing from the scope of the present invention.

The DAS 9 shown in FIG. 5 can be coupled with the strain gauge sensing element 8 for each sootblower lance 86 in a wired or wireless configuration so as to record each strain value sensed by the strain gauge sensing element 8 and to generate a corresponding value, based on each sensed strain value from the strain gauge sensing element 8, that is indicative of the one or more reactive forces translated back to the lance 84. The DAS 9 can also store alignment information about each sootblower 84 that is associated with the values sensed by its corresponding strain gauge sensing element 8. As noted above, the linear encoders 186 and the rotary encoders 190 are coupled to the control system 6, such that the control system 6 receives data generated by the encoders 186 and 190 corresponding to sensed linear and angular positions of the sootblowers 84. As also noted above, the DAS 9 may communicate with the control system 6. Hence, the DAS 9 may continuously receive sootblower alignment data from the control system 6 comprising a sootblower linear position and an angular position for each sootblower. Accordingly, for each reactive force value generated by the DAS 9, the DAS 9 may correspond or assign to that reactive force value sootblower alignment data comprising the linear position and the angular position of the sootblower 84 when the strain gauge sensing element 8 sensed the data related to and used to calculate the reactive force value. The DAS 9 can also associate a time period to the reactive force value corresponding to the time when the strain gauge sensing element 8 sensed the data related to and used to calculate the reactive force value. When the sootblower is operating with a fixed linear and rotational speed, each reactive force value may be correlated to a particular linear and rotational position by using the start and/or end time of the sootblower operation and an internal time stamp maintained by the DAS 9.

Alternatively, if a given sootblower lance 86 starts at a known position and a known rotational orientation at a particular point in time, then if its rate of travel and its rate of rotation is known, its location (within the boiler) and angular orientation (with respect to a reference position or value) can be determined at any point in time based on the time that has elapsed since that particular point in time. The DAS 9 can therefore associate a sootblower linear location and angular orientation corresponding to a time period in which a sensed strain value is received from the strain gauge sensing element 8.

FIG. 6 is an illustration of a portion of a sootblower 84 with a torque-related measurement device, e.g., a strain gauge sensing element 8, and a data acquisition system 9 installed thereon. A sootblowing cycle begins with the sootblower 84 in the home position. When power is supplied to its linear drive device 184, the device 184 moves the sootblower lance into the recovery boiler 10 through a furnace wall. Once its nozzles 88 are inside the boiler, high pressure steam can be introduced into the sootblower 84 to begin a cleaning cycle. The linear drive device 184 can continue to translate the sootblower lance 86 into the boiler 10, while its rotary drive device 188 rotates the sootblower lance 86 until it reaches its maximum-in position. At this point, the linear drive device 184 is controlled so as to reverse its direction. Additionally, at this time, the rotary drive device 188 can rotate the sootblower 84 a predetermined different amount so as to create a different nozzle path as the sootblower lance 86 is pulled in a direction out of the boiler 10. The linear drive device 184 will continue to retract until the nozzle 88 is near the furnace wall at which point the high pressure steam can be turned off.

Figure 7:
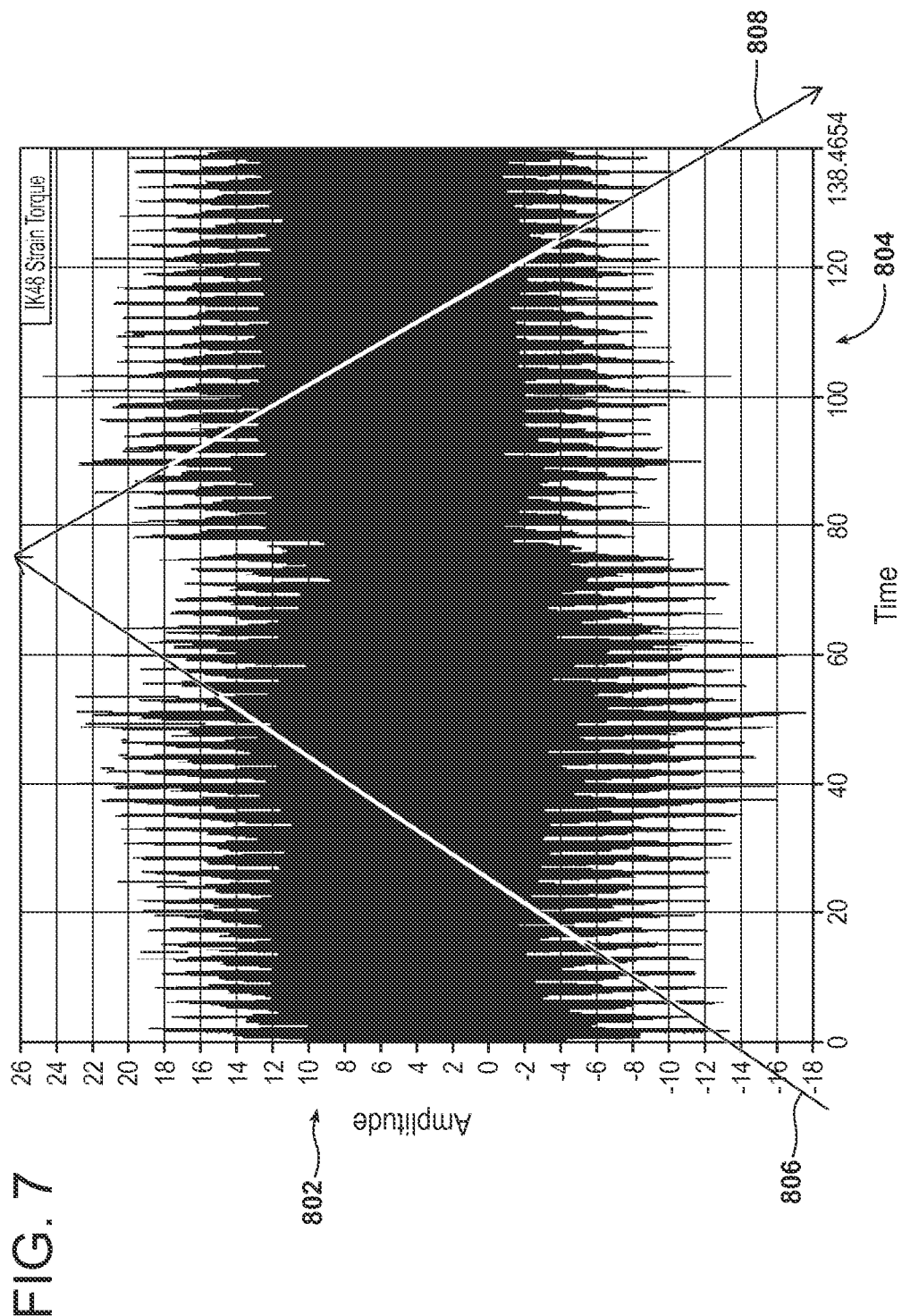
FIG. 7 depicts a time-domain representation of a value indicative of a reactive force sensed by the torque-related measurement device of FIG. 7 during travel of a sootblower in accordance with the principles of the present invention.

FIG. 7 depicts a time-domain representation of values which may be generated by the DAS 9 based on data received from the strain gauge sensing element 8 indicative of reactive forces applied to a sootblower 84 during travel of the sootblower 84 through first and second strokes during boiler operation. The horizontal axis represent time (in seconds) since movement of the sootblower from its home position has begun. The line 806 represents travel of the sootblower lance 86 in a direction into the boiler and terminates when the sootblower lance reaches its maximum-in position. The line 808 represents travel of the sootblower lance 86 in a direction out of the boiler and terminates once the sootblower lance returns to its home position. During that span of travel of the sootblower lance 86, the strain gauge sensing element 8 senses and collects data related to reactive forces translated back to the sootblower lance 86 through one or both of the steam jets emitted by the nozzles 88 that impinges on either fouling ash deposits on heat transfer surfaces 67 of heat transfer elements 64 or directly on the heat transfer surfaces 67. As discussed, the sensed strain values are used by the DAS 9 to generate values indicative of the reactive forces and the amplitudes of those generated values indicative of the reactive forces are represented by the vertical axis 802 of FIG. 7.

Figure 8:
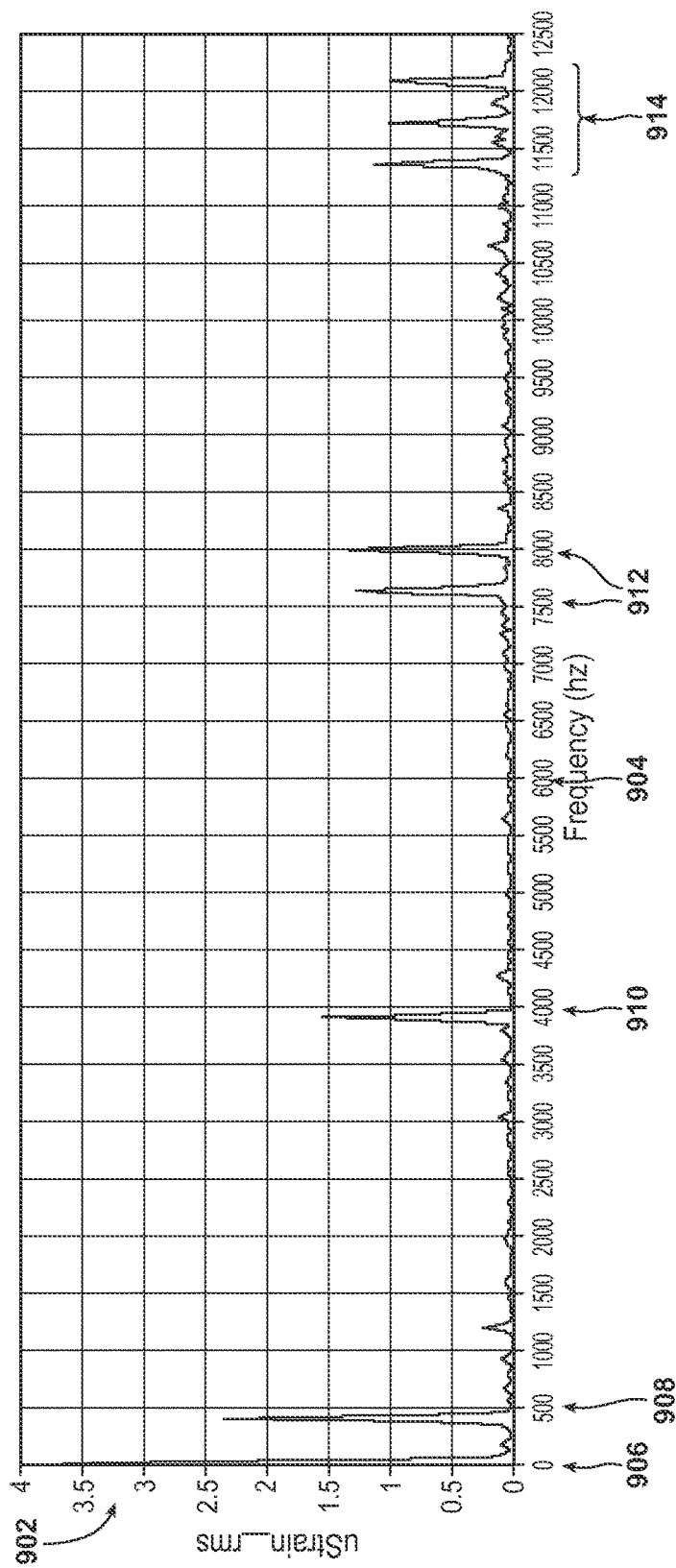
FIG. 8 depicts a frequency-domain representation of the time-domain data of FIG. 8, in accordance with the principles of the present invention.

FIG. 8 depicts a frequency-domain representation of the time-domain data of FIG. 7, in accordance with the principles of the present invention. Fourier analysis can be performed on the time-domain data depicted in FIG. 7. It is contemplated that the DAS 9 may covert the FIG. 7 time-domain data to the FIG. 8 frequency-domain data. In FIG. 8 the time domain signal of FIG. 7 has been converted into its frequency-domain components wherein the horizontal axis 904 represents various frequencies and the vertical axis 902 represents an amplitude of spectral energy at those frequencies. As can be seen, there are a number of frequency bands 906, 908, 910, 912, 914 in which there are peaks of spectral energy relative to other frequency values. One aspect of FIG. 8 is that the horizontal axis 904 extends out to a frequency of about 12,500 Hz and, therefore, indicates that the value sensed by the strain gauge 8 structure can be sampled at a rate of about 25,000 Hz to generate the time domain data represented in FIG. 7; however, lower sampling rates are contemplated within the scope of the present invention as well.

Not all of these frequency bands 906-914 may be related to one or both of the jet streams from the sootblower lance 86 impinging on either fouling ash deposits on heat transfer surfaces 67 of heat transfer elements 64 or directly on heat transfer surfaces 67. They may be related to other periodically repeating components or activities within the boiler 14 or the sootblower itself such as, for example, forces generated by bearings, gears, motors, etc. Thus, further analysis of the various frequencies ranges can be performed to determine which of the bands 906-914 appear to be most related to the sensed values from the strain gauge sensing element 8 caused by the reactive forces translated back to the lance 86 by one or both of the steam jets 304, 305. One such frequency band 908 that ranges from about 300 to 500 Hz may be empirically investigated to determine if it is likely associated with the varying signal values sensed by the strain gauge sensing element 8 and corresponding to the reactive forces translated back to the lance 86 by one or both of the steam jets 304, 305. One of ordinary skill will recognize that the range from 300 Hz to 500 Hz was selected as one example range and that other ranges of frequencies may of interest as well.

Figure 9:
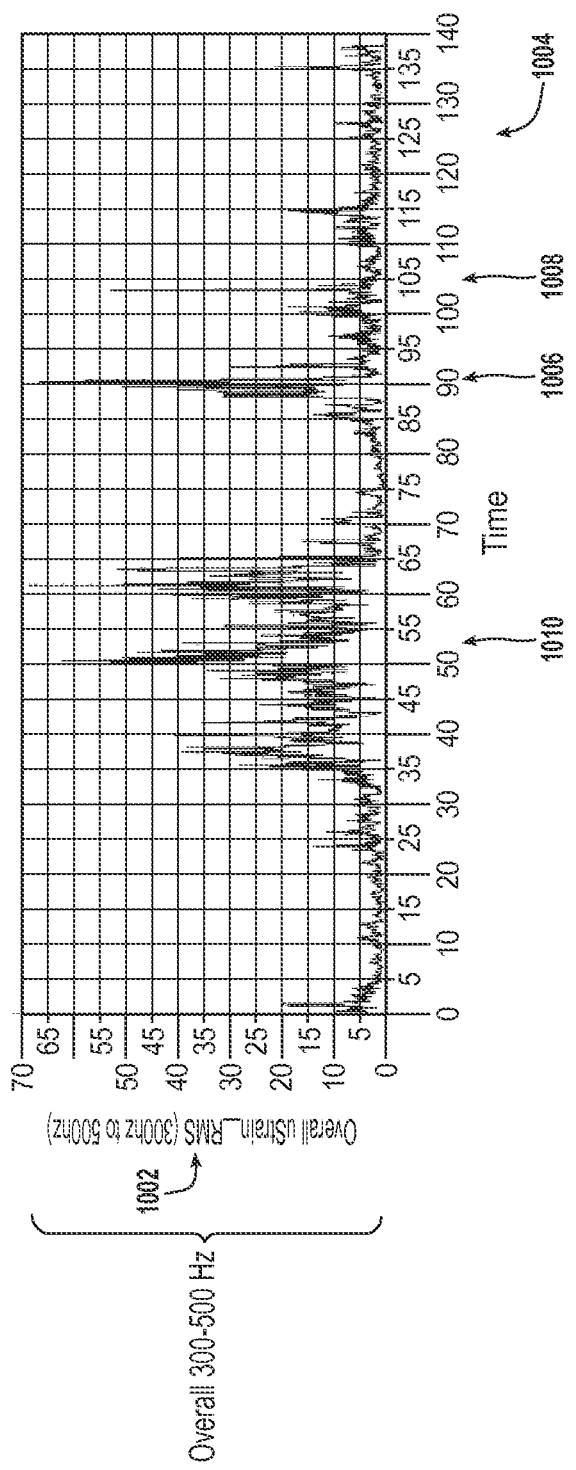
FIG. 9 depicts a time domain representation of a limited band of frequencies selected from the time-domain data of FIG. 7, in accordance with the principles of the present invention.

As a result, the frequency domain signal depicted in FIG. 8 can be filtered by the DAS 9 to include only components related to frequencies between 300 Hz and 500 Hz. Conversion of only those filtered components back into the time-domain, results in the signal shown in FIG. 9. FIG. 9 depicts a time domain representation of a limited band of frequencies selected from the time-domain data of FIG. 7, in accordance with the principles of the present invention. In FIG. 9, the horizontal axis 1004 once again represents an amount of time since a sootblower lance 86 has begun travel from a home position and the vertical axis 1004 represents an amplitude measured in the same units of measurement as that of FIG. 7. Within the signal of FIG. 9, a number of high amplitude peaks 1006, 1008, 1010 are evident.

As noted above, for each reactive force value generated by the DAS 9, the DAS 9 may correspond or assign to that reactive force value sootblower alignment data comprising the linear position and the angular position of the sootblower 84 when the strain gauge sensing element 8 sensed the data related to and used to calculate the reactive force value. The DAS 9 can also associate a time period to the reactive force value corresponding to the time when the strain gauge sensing element 8 sensed the data related to and used to calculate the reactive force value. The DAS 9 may further assign a time value to each sootblower alignment with a 0 start time occurring when the sootblower 84 began its travel from its first home position. By knowing the locations of the platen front edges 61B-63B relative to the sootblower first home position, and the time values for each sootblower alignment when the data shown in FIG. 7 was collected, the times when those high amplitude peaks 1006, 1008, 1010 in FIG. 9 occurred can be compared to the times when the sootblower nozzles 88 were positioned adjacent to front edges 61B-63B of the platens 61A-63A. If many of those peaks occurred at substantially the same time that the sootblower nozzles 88 were positioned adjacent to the platen front edges 61B-63B, then it is believed that the strain gauge sensing element 8 was sensing strain values related to reactive twisting forces or torques being applied to the sootblower lance 86. Therefore, it is believed that, at the time instances corresponding to the high amplitude peaks 1006, 1008 and 1010, one or both of the jets of steam from the sootblower lance 86 were impinging on either fouling ash deposits on heat transfer surfaces 67 or directly on heat transfer surfaces 67. Since the DAS 9 communicates with the control system 6 and the latter receives data generated by the encoders 186 and 190 corresponding to sensed linear and angular positions of the sootblowers 84, the DAS 9 may correspond each of the peaks 1006, 1008 and 1010 with corresponding sootblower alignment data comprising the linear position and the angular position of the sootblower 84 when the corresponding strain gauge sensing element 8 sensed the data corresponding to the peaks 1006, 1008 and 1010.

Because the signal of FIG. 9 includes high amplitude peaks and those peaks seem to have occurred when the sootblower was adjacent to platen front edges 61B-63B, it is believed that the frequency band 908 that ranges from 300 to 500 Hz is associated with the varying signal values sensed by the strain gauge sensing element 9 and corresponding to reactive forces translated back to the sootblower by one or both of the steam jets. Had the frequency band 908 that ranged from 300 to 500 Hz not included high amplitude peaks or included many high amplitude peaks that did not occur when the sootblower was adjacent to the platen front edges 61B-63B, other various frequency bands of the FIG. 9 data could be empirically investigated to determine if one or more of those bands might include high amplitude peaks, that may be associated with the varying signal values sensed by the strain gauge sensing element 8 and corresponding to the reactive forces translated back to the lance 86 by one or both of the steam jets 304, 305. It is believed that a review of the various frequency bands 906-914 in FIG. 8 will need to occur during a calibration procedure at the time the sootblower system 2 is initially commissioned and at other times if significant changes to the sootblower system 2 are encountered.

The strain gauge sensing element described above is sensing a net result of the reactive force 306 translated back to the lance 86 by steam jet 304, see FIG. 4, and a reactive force (not shown in FIG. 4) translated back to the sootblower lance 86 via steam jet 305. If the steam jet 304 does not strike a platen surface 67 or a deposit 302, the magnitude of its reactive force on the lance 86 may be zero or nearly zero. Likewise, if the steam jet 305 does not strike a platen surface 67 or a deposit 302, the magnitude of its reactive force on the lance 86 may be zero or nearly zero. The strain gauge sensing element 8 described above may not be able to distinguish what portion of the net results is attributable to the reactive force 306 from the steam jet 304 and what portion is attributable to the reactive force from the steam jet 305. One of ordinary skill will recognize that sensing elements can be positioned and arranged to determine bending or translational forces on the sootblower lance 86 so that the individual contribution could be calculated.

However, in the arrangement where the strain gauge sensing element 8 detects the net result of one or both of the forces translated back to the lance 86 via one or both of the steam jets 304, 305, there is uncertainty about whether any strain on the sootblower lance is a result of a) spray 304 striking a platen heat transfer surface 67 or deposit 302, b) spray 305 striking a platen heat transfer surface 67 or deposit 302, or c) both sprays 304, 305 striking respective platen heat transfer surfaces 67 or deposits 302. So, while the presence of at least one deposit or at least one platen heat transfer surface 67 at a particular alignment of the sootblower lance 86 can be determined, it cannot be determined, unless one or more additional sensors are provided, if one or two deposits/platen heat transfer surfaces were located by the strain gauge sensing element 8.

This apparent uncertainty may be insignificant for at least two different reasons. During cleaning operations, the sootblower lance of the illustrated embodiment sprays streams of steam out of both nozzles concurrently. Therefore, if a cleaning operation of the sootblower lance is performed at an alignment known to correspond to a deposit, then that deposit will be struck by at least one steam jet and likely by both steam jets as the sootblower rotates. Secondly, FIG. 3B illustrates that the manner in which deposits 302 actually form within the superheater section 60 provides additional information to determine which of the two possible locations the deposit 302 is actually located at. For example, in FIG. 3B, a determination may be made that at this particular alignment of sootblower lance 86, there is a deposit 302 on at least one of the surfaces of platens 64 adjacent to the nozzles 88. The strain gauge sensing element 8 may not be able to determine that it is specifically the spray 304 from the right-hand nozzle that is striking a deposit but knowledge about the configuration of the locations of the platens 61A-63A and the direction of hot gas flow allows any ambiguity to be resolved by assuming any deposit encountered at a particular alignment will be on the front edge 61B-63B of a platen 61A-63A rather than a back edge 61C-63C of a platen 61A-63A.

Figure 10:
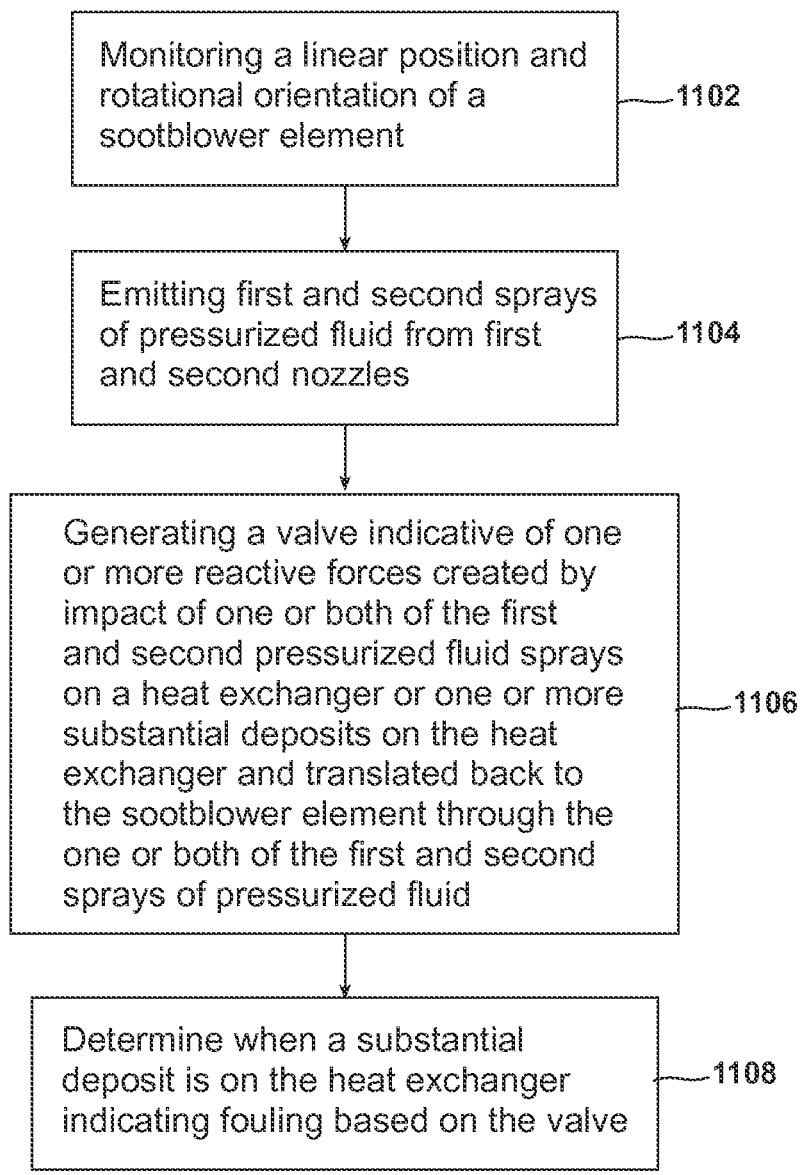
FIGS. 10, 11A, 11B depict respective flowcharts of example methods for detecting fouling on a heat exchanger surface in accordance with the principles of the present invention.
Figure 11A:
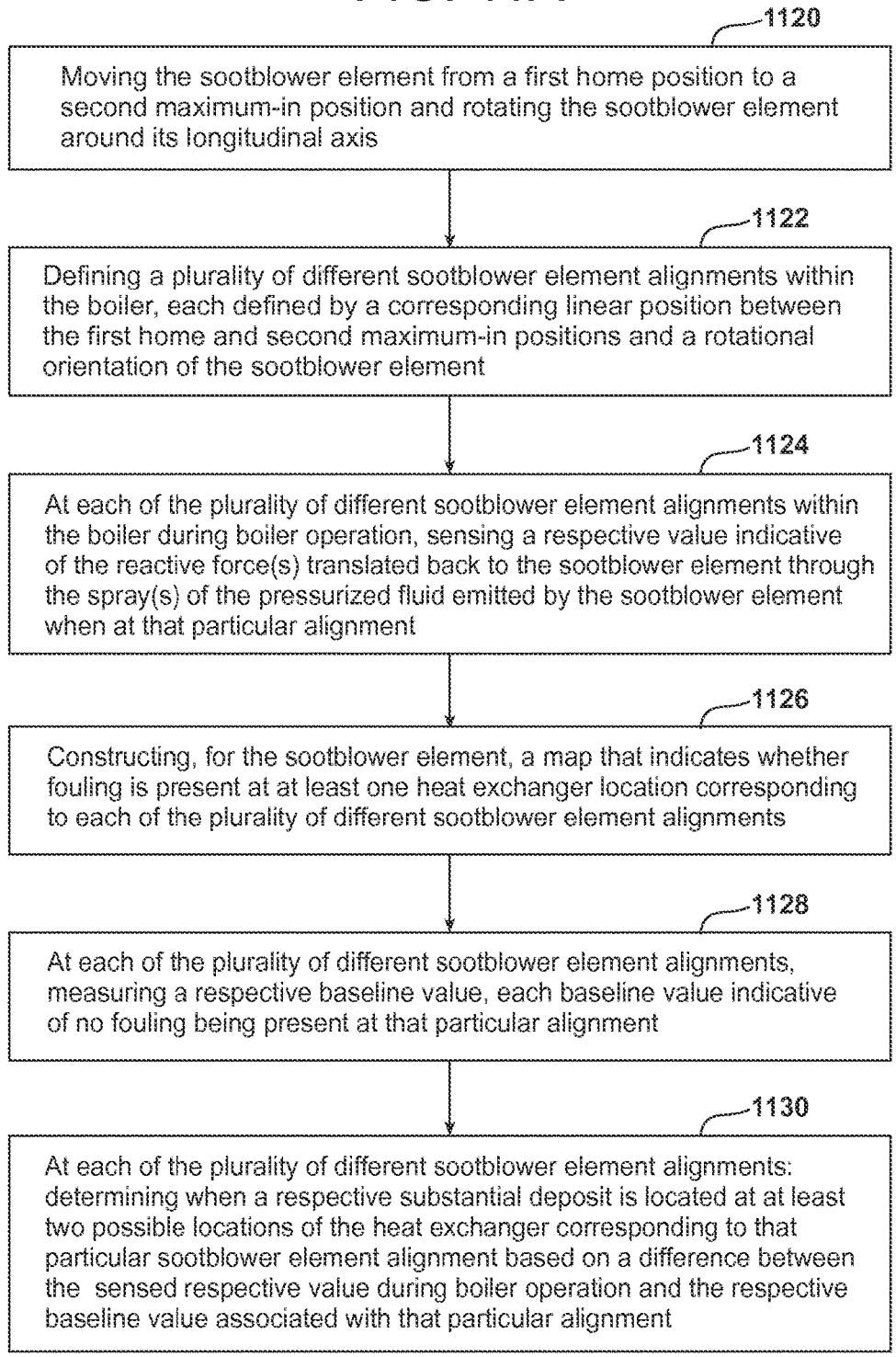
Figure 11B:
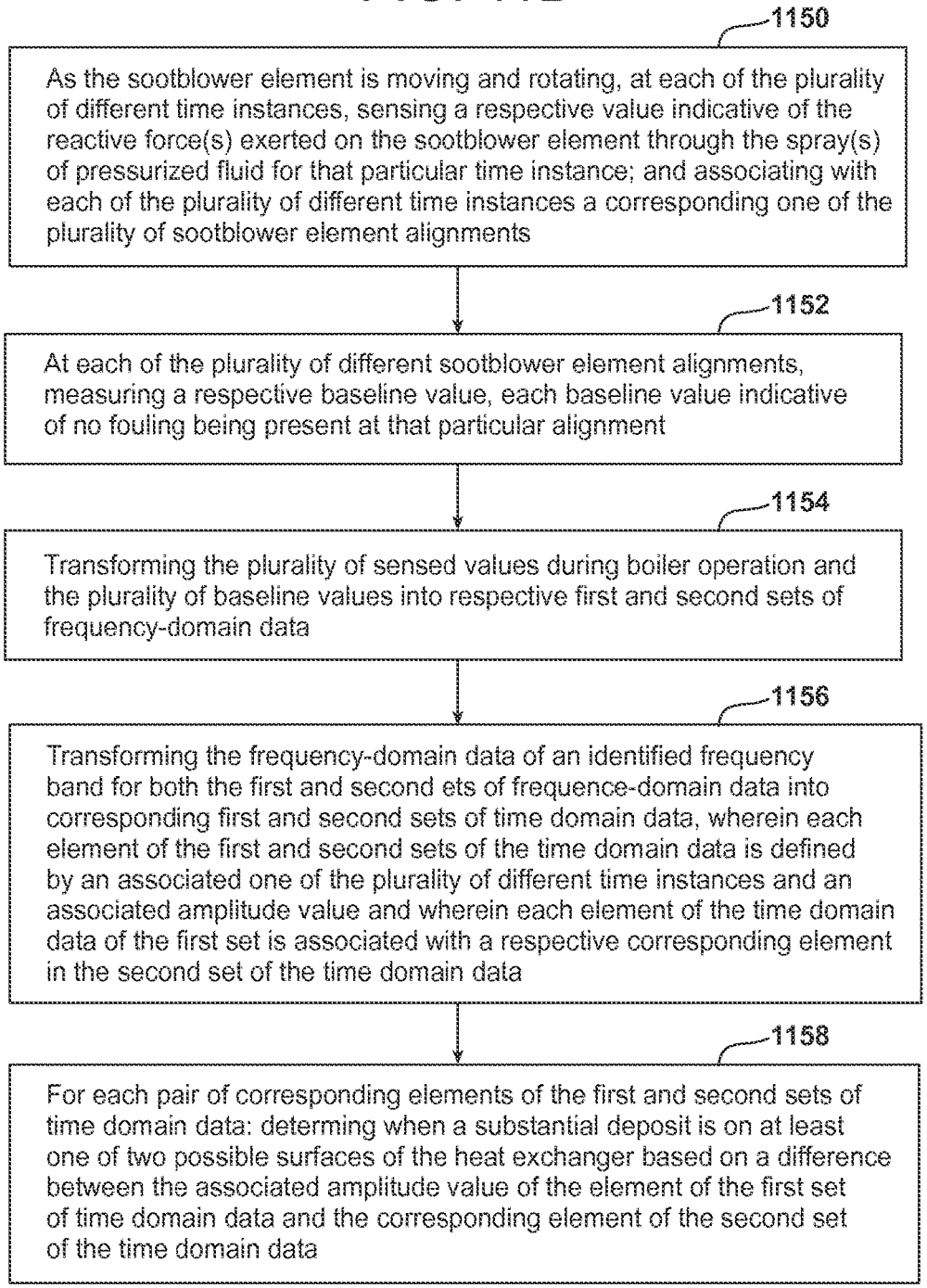

FIGS. 10, 11A, and 11B depict respective flowcharts of example methods for detecting fouling on a heat transfer surface 67 in accordance with the principles of the present invention. In accordance with the method of FIG. 10, a linear or lateral position of a sootblower element 84 (e.g., sootblower nozzles 88) is monitored, in step 1102. An angular orientation of the sootblower nozzles 88 is also monitored. Thus, at a particular point in time, the linear position of the sootblower nozzles 88 within a boiler and the angles at which jets of steam are emitted from the two nozzles 88 are known. Based on this information and predetermined knowledge about the configuration and locations of the platens 61A-63A within the boiler, a determination can be made as to where the jets of steam emitted from the nozzles 88 are located within the superheater section 60 relative to the platens 61A-63A at that particular point in time. Accordingly, any data being sensed that is related to the jets of steam can be associated with one of two possible locations within the superheater section 60.

Thus, the method of FIG. 10 continues in step 1104 with emitting first and second sprays of pressurized fluid from first and second nozzles of the sootblower element and, in step 1106, generating a value indicative of one or more reactive forces created by impact of one or both of the first and second pressurized fluid sprays on a heat exchanger, e.g., one or more of the platens 61A-63A, or one or more substantial deposits on the heat exchanger and translated back to the sootblower element through one or both of the first and second sprays of the pressurized fluid. As explained in more detail below, the sensed value is used, in step 1108, to determine when a substantial deposit is on the heat exchanger indicating fouling based on the value.

The flowchart of FIG. 11A provides additional details about how the method of FIG. 10 can be accomplished. The method of FIG. 11A begins in step 1120 in which the sootblower control system 6 controlling movement of the sootblower element (e.g., sootblower nozzles) via the linear drive device 184 from a first home position to a second maximum-in position and also rotating the sootblower element via the rotary drive device 188 around its longitudinal axis. Accordingly, in step 1122, a plurality of different sootblower element alignments within the boiler, e.g., within the superheater section 60, can be defined wherein each alignment is defined by a corresponding linear position between the first home and second maximum-in positions and a rotational orientation of the sootblower element.

As described with respect to FIG. 12B, a map can be constructed related to values sensed by the strain gauge sensing element 8 at different sootblower element alignments. Accordingly, in step 1124, at each of the plurality of different sootblower element alignments within the boiler during boiler operation, a respective value indicative of the one or more reactive forces translated back to the sootblower element through one or both of the first and second sprays of the pressurized fluid emitted by the sootblower element when at that particular alignment can be sensed. Then, in step 1126, a map can be constructed for the sootblower element, that indicates whether fouling is present at at least one of two possible heater exchanger locations corresponding to each of the plurality of different sootblower element alignments.

Steps 1128 and 1130 of FIG. 11A relate to one possible way to assist in making the determination as to whether fouling is present at a particular sootblower element alignment. Initially, in step 1128, at each of the plurality of different sootblower element alignments, a respective baseline value is measured wherein each baseline value is indicative of no fouling being present at that particular alignment. As discussed above with respect to FIG. 5, the sootblower lance can be operated in a boiler in which there is no fouling present on the platens 61A-63A. The resulting values sensed by the strain gauge sensing element 8 can, therefore, provide baseline values representing reactive torque that results from the inherent structure of the boiler rather than any fouling or deposits on the surfaces of the heat exchanger platens 61A-63A.

The sensed value from the strain gauge at a particular sootblower element alignment during operation of the boiler can be compared to a baseline value at that alignment to determine a difference between the two values. This difference, rather than simply a raw value from the strain gauge, can be used to make a determination about whether fouling is present at the particular sootblower element alignment. Thus, in step 1130, at each of the plurality of different sootblower element alignments the determination that a respective substantial deposit is located at at least two possible locations of the heat exchanger corresponding to that particular sootblower element alignment is made based on a difference between the sensed respective value during boiler operation and the respective baseline value associated with that particular alignment. For example, when the sensed respective value during boiler operation is greater than about 140% to about 170%, and preferably 150%, of the respective baseline value, it is believed a determination can be made that fouling is likely present at the particular sootblower element alignment. Determining that a ratio of the two values is greater than a certain amount is equivalent to determining that a difference between the two values has exceeded some predetermined threshold and takes into account that the units by which the two values are measured may vary in different embodiments of the present invention. One of ordinary skill will also recognize that the specific ratio amount (e.g., 150%) to be used can vary based on the design of the sootblower element and the configuration and design of the recovery boiler but can be determined through one or more empirical calibration efforts.

In particular, some analysis of the sensed values can be performed with respect to time-domain data and other analysis can be performed with respect to frequency-domain data. Thus, at least some of the steps of FIG. 11A can be performed as outlined in FIG. 11B.

As in FIG. 11B, the sootblower element 84 moves in a lateral direction and also rotates as it emits sprays of pressurized fluid while the nozzles 88 are adjacent to respective surfaces of the various platens 61A-63A. The lateral position and the angular orientation of the sootblower element defines a particular sootblower alignment. In step 1150, as the sootblower element is moving and rotating, at each of a plurality of different time instances, a respective value is sensed that is indicative of the one or more reactive forces exerted on the sootblower element 84 through one or both of the first and second sprays of pressurized fluid for that particular time instance. Also in step 1150, each of the plurality of different time instances is associated with a corresponding one of the plurality of sootblower element alignments.

In addition to the sensed values collected during operation of the sootblower element 84, baseline values (as described in step 1128 of FIG. 11B) can also be collected. Thus, in step 1152, at each of the plurality of different sootblower element alignments, a respective baseline value can be measured wherein each baseline value is indicative of no fouling being present at that particular alignment.

At this point, the values sensed during operation of the boiler and the baseline values are time-domain data and can each be converted into respective frequency-domain data. As one of ordinary skill will recognize, discrete time domain data can be transformed using a discrete Fourier transform (e.g., Fast Fourier Transform) into frequency domain data.

Thus, in step 1154, the plurality of sensed values during boiler operation are transformed into a first set of frequency domain data and the plurality of baseline values are transformed into a second set of frequency-domain data. Once in the frequency domain, in the manner discussed above, a plurality of frequency bands of one or both of the first and second sets of the frequency-domain data can be reviewed to identify a particular frequency band among the plurality of frequency bands, wherein the particular frequency band is more likely than any of the other frequency bands of the plurality to have a response that corresponds to the sensed respective values caused by one or more reactive forces translated back to the sootblower element 84 by one or both of the first and second sprays of pressurized fluid. For example, the second set of frequency-domain data may be used to initially identify a particular frequency band of interest and the first set of frequency-domain data can then be used to verify that the identified frequency band is the desired one. Thus, a particular frequency band can be identified whose data is likely related to, or indicative of, the reactive force(s) translated back to the sootblower element 84 through one or both of the first and second sprays of steam emitted from the sootblower nozzles 88. This particular frequency band can then be analysed in more detail than data from the other frequency bands of the frequency domain data.

In step 1156, the frequency-domain data of the identified frequency band for the first set of frequency domain data (operational values) is transformed into a first set of time domain data. Also, the frequency domain data of the identified frequency band for the second set of frequency domain data (baseline values) is transformed into a second set of time domain data. Returning to the time domain results in the data once again corresponding to the time instances (from step 1150) utilized to collect the original sensed values. Thus, each element of the first and second sets of the time domain data may be defined by an associated one of the plurality of different time instances and an associated amplitude value.

At a particular time instance, the operational-related value from the first set of time domain data can be compared with the corresponding baseline-related value from the second set of time domain data. This comparison can indicate whether or not fouling was encountered by the sootblower nozzle at that particular time instance. Because that time instance is also associated with a particular sootblower alignment, the determination indicates whether fouling is present at at least one of two possible heat transfer surfaces 67 of the platens 61A-61C that are adjacent to respective sootblower nozzles 88 at that particular sootblower alignment.

Therefore, in step 1158, for each pair of corresponding elements of the first and second sets of time domain data a determination is made whether a substantial deposit is on at least one of the two possible heat transfer surfaces 67 of the platens 61A-61C of the heat exchanger based on a difference between the associated amplitude value of the element of the first set of time domain data and the corresponding element of the second set of the time domain data. For example, if this difference for a pair of elements is greater than a predefined threshold, then this indicates that a substantial deposit is likely (e.g., a confidence level greater than about 95%) at the particular sootblower alignment associated with those two elements. As alluded to above, when the associated amplitude value of the element of the first set of time domain data is greater than about 140% to about 170%, and preferably 150%, of the value of the corresponding element of the second set of time domain data, it is believed a determination can be made that fouling is likely present at the particular sootblower element alignment associated with those two elements. As mentioned above, determining that a ratio of the two values is greater than a certain amount is equivalent to determining that a difference between the two values has exceeded some predetermined threshold and also takes into account that the units by which the two values are measured may vary in different embodiments of the present invention.

To assist in some of the above-described steps, one or more maps can be constructed that represent the sensed values from the strain gauge 8 as well as the lateral position and the rotational orientation of the sootblower nozzles 88. FIG. 12A illustrates a baseline map 1210 that has a number of columns 1212 and a number of rows 1214. Each of the columns 1212 represent a particular lateral position (relative to a reference position) of the sootblower nozzles 88 and each of the rows 1214 represents a particular angular, or rotational, orientation (relative to a reference orientation) of the sootblower nozzles 88. Thus, each element 1202 of the map 1210 represents a defined sootblower element alignment. The value at each element 1202 corresponds to the sensed value from the strain gauge sensing element 8 when the sootblower element was located at that particular sootblower element alignment. As described above, the baseline sensed values are the sensed values that are indicative of no fouling being present on the heat transfer surfaces of the platens 61A-63A.

FIG. 12B is a similarly constructed map 1220 that has columns 1212 representing a lateral position of the sootblower nozzles 88 and rows 1214 represent an angular orientation of the sootblower nozzles 88. Each element 1204 of the table also corresponds to a sensed value from the strain gauge occurring when the sootblower element is at the particular alignment, wherein that alignment is defined by a specific combination of a lateral position and an angular orientation. However, different from the map 1210 of FIG. 12A, the values in the elements 1204 of map 1220 reflect sensed values from the strain gauge sensing 8 that are collected during normal operation of the boiler.

Figure 12C:
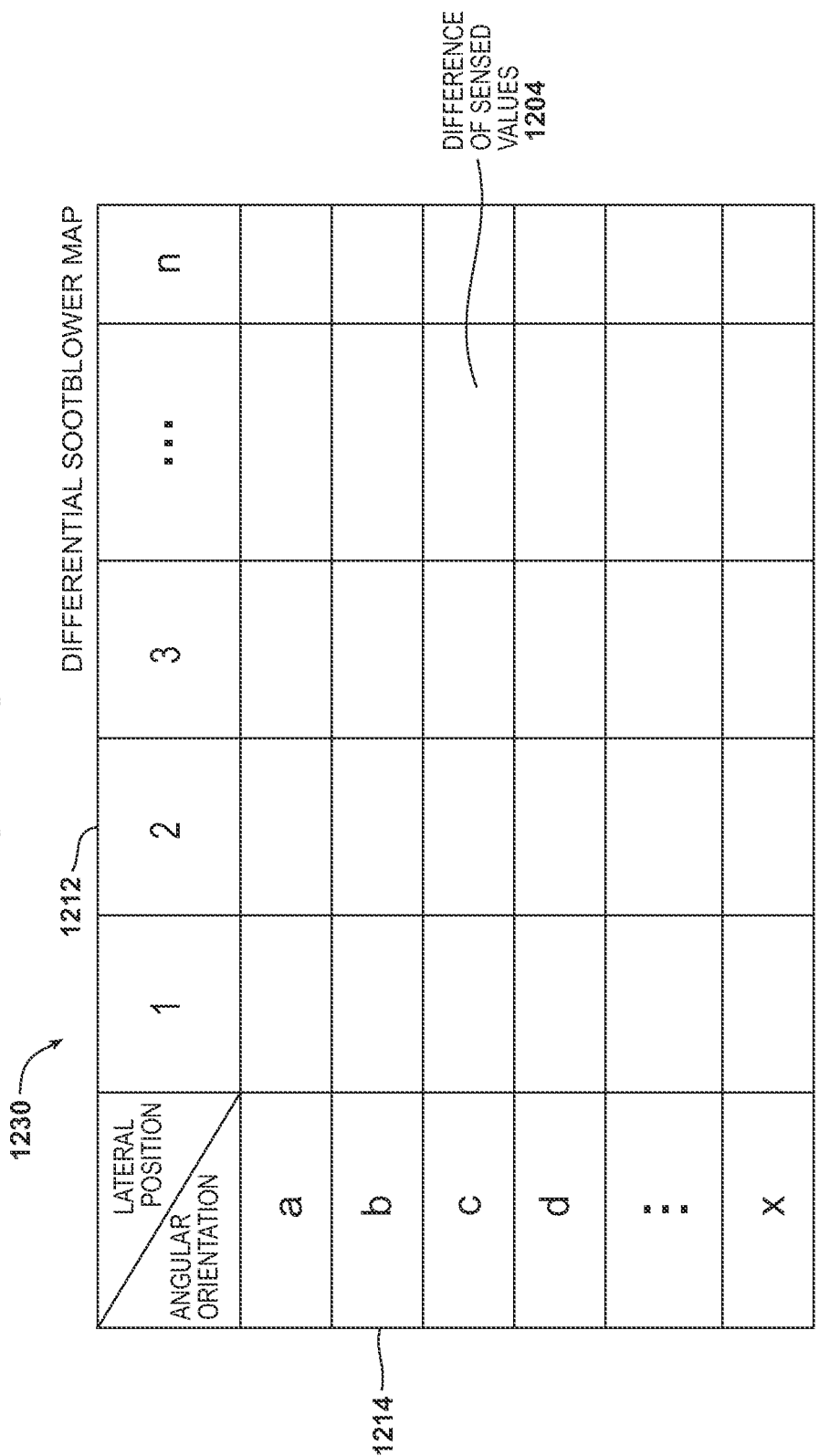

Based on the two maps 1210, 1220 of FIGS. 12A and 12B, a third map 1230 as shown in FIG. 12C can be constructed. Each element 1206 of the map 1230 also corresponds to a particular defined sootblower alignment. However, the value of each element 1206 represents a difference between the operational value 1204 sensed at that alignment and the baseline value 1202 measured at that alignment. The element values 1206 from the map 1230 can be used to determine if a substantial deposit is located which corresponds to a particular sootblower alignment. Hence, whether or not steam jets are emitted at a particular sootblower alignment to effect cleaning of platen heat transfer surfaces 67 depends upon the value from the map 1230 corresponding to that sootblower alignment. For example, if the value in the map 1230 is above a predefined threshold, indicating that a substantial deposit is likely at a location corresponding to that sootblower alignment, steam would be emitted from the nozzles 88 while the sootblower was at that corresponding alignment. The rate and duration of steam emitted at a given sootblower alignment could also vary based on the value of the corresponding value in the map 1230 for that sootblower alignment.

A corresponding set of maps can be constructed for each direction of travel of the sootblower element. Thus, even though a sootblower nozzle is at a particular lateral position and a particular angular orientation, the sensed value from the strain gauge can depend on whether the sootblower nozzle is traveling in a direction into the boiler or in a direction out of the boiler. Accordingly, respective sets of maps 1210-1230 can be constructed for each direction.

The baseline map 1210 of FIG. 12A can be constructed in a variety of different ways. Assuming that a sootblower element travels at the same rate and rotates at the same rate during both baseline data collection and operational data collection, then the angular orientation at a particular lateral position match for the different data collections only if the starting angular orientation of the sootblower element was the same for each set of data collection. Because this condition may not always be true, the baseline map can be constructed differently than the conceptual depiction 1210 shown in FIG. 12A.

According to at least one embodiment of the present invention, the sootblower could be run in two different modes: a sense mode, and a cleaning mode. In the "sense mode" the sootblower can be operated in a state that is advantageous (i.e., selecting a pressure, speed, and/or flow) for sensing the deposits. The sootblower could be run in the sense mode to establish the initial baseline values as well as to detect buildup during the operation of the boiler (e.g. daily). The sootblower could be run in its cleaning mode based on the results of one or more operations in the sense mode. While running in cleaning mode, a sootblower's process variables (e.g., speed, pressure, flow, etc.) could be different than when running in the sense mode and can also be varied to deliver beneficial cleaning results depending on a location of the sootblower within the boiler. However, in sense mode the sootblower's process variables would be fixed from operation to operation in order to maintain consistency between the baseline sense and each sensing operation. For example, the pressure and velocity of the jets may be lower during the sense mode than in the cleaning mode.

For example, the baseline map 1210 may have x rows 1214 representing x different angular positions. However, during a single traversal of the sootblower element from the home position to a maximum-in position, the sootblower element happens to be at only a single angular orientation at each lateral position (the columns 1212 of map 1210). Thus, x, or possibly more than x, different baseline data collection runs can be performed in order to populate the different rows 1214 for each of the lateral positions represented by the column 1212. In this way, the baseline map 1210 can be constructed to have a baseline value in each of its (x times n) elements. Alternatively, during baseline data collection, a sootblower element can stay at a particular lateral position and be rotated through a range of angular orientation in order to collect the values to populate the row 1214 of the map.

Accordingly, during data collection performed while the boiler is operating, a sensed value (from table 1220) when the sootblower element is at a lateral position "3" may coincide with an angular orientation at position "c". The baseline map 1210, because it has been constructed to have a baseline value in each element, will have a value that can be compared to the operational-related sensed value to determine a difference. Thus, during a single operational traversal of a sootblower element between the home position and the maximum-in position each column 1212 of maps 1220 and 1230 will have a meaningful value in only a single row 1214 while the baseline map 1210 can have relevant values in each of the rows 1214 for every column 1212.

However, after multiple operational traversals, the difference map 1230 of FIG. 12C can be populated such that for a particular column (i.e., sootblower lateral position) values indicative of fouling can be collected for a plurality of the different rows (i.e., sootblower angular orientation).

The map 1230 of FIG. 12C can be beneficial in controlling operation of a sootblower for cleaning the platens 61A-63A of a boiler. In particular, each element of the map 1230, for a particular sootblower element, is indicative of whether or not a substantial deposit, or fouling, was encountered while the sootblower element was at the particular alignment corresponding to that table element. A corresponding map 1230 can be constructed for every sootblower element within a boiler and thereby create a three-dimensional map of the inside of the superheater section 60 that indicates where fouling is present. Thus, a sootblower control system can be constructed such that when a sootblower element is at a particular alignment associated with fouling, then steam can be emitted from the sootblower element at a rate and for a duration related to the amount of fouling at that alignment. Conversely, when the sootblower element is at a particular alignment not associated with fouling, then emission of any steam can be avoided.

In this manner, efficient and effective control of the sootblower elements can be accomplished during cleaning of the boiler platens.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of detecting fouling of a heat exchanger of a boiler, the method comprising:
   emitting first and second sprays of pressurized fluid from respective first and second nozzles of a sootblower element;
   generating a value indicative of one or more reactive forces translated back to the sootblower element through one or both of the first and second sprays of the pressurized fluid, wherein the one or more reactive forces are created by impact of one or both of the first and second pressurized fluid sprays on a heat exchanger or one or more substantial deposits on the heat exchanger; and
   determining when a substantial deposit is on the heat exchanger indicating fouling based on the generated value.

2. The method of claim 1, wherein each of the first and second sprays of pressurized fluid comprises a subsonic stream of steam.

3. The method of claim 1, wherein the one or more reactive forces comprise one or more twisting forces exerted on the sootblower element.

4. The method of claim 3, wherein the generated value is based on a sensed value from a strain gauge sensing element arranged on the sootblower element to detect the sensed value.

5. The method of claim 1, comprising:
   determining a linear position of the nozzles relative to a reference position;
   determining a rotational orientation of at least one of the nozzles relative to a reference orientation;
   determining whether one or more substantial deposits are on the heat exchanger based on the generated value, the linear position of the nozzles, and the rotational orientation of the at least one nozzle; and
   if it is determined that one or more substantial deposits are on the heat exchanger, determining a particular pair of possible locations of the one or more substantial deposits on the heat exchanger based on the linear position of the nozzles and the rotational orientation of the at least one nozzle.

6. The method of claim 5, wherein determining the linear position of the nozzles and the rotational orientation of the at least one nozzle is based on a period of time that has transpired since an initial time.

7. The method of claim 1, comprising:
   moving the sootblower element from a first home position to a second maximum-in position in a direction substantially perpendicular to a plurality of platens of the heat exchanger;
   rotating the sootblower element around its longitudinal axis; and
   defining a plurality of different sootblower element alignments within the boiler, each defined by a corresponding linear position between the first home and second maximum-in positions and a rotational orientation of the sootblower element.

8. The method of claim 7, comprising:
   at each of the plurality of different sootblower element alignments within the boiler during boiler operation, generating a respective value indicative of the one or more reactive forces translated back to the sootblower element through one or both of the first and second sprays of the pressurized fluid emitted by the sootblower element when at that particular alignment.

9. The method of claim 8, comprising:
   constructing, for the sootblower element, a map that indicates whether at least one substantial deposit is located at at least one heat exchanger location corresponding to each of the plurality of different sootblower element alignments.

10. The method of claim 8, comprising:
    at each of the plurality of different sootblower element alignments, measuring a respective baseline value, each baseline value indicative of no fouling being present at that particular alignment.

11. The method of claim 10, wherein moving the sootblower element and rotating the sootblower element while measuring the respective baseline values occur substantially at a same rate as when generating the respective values indicative of the one or more reactive forces during boiler operation.

12. The method of claim 10 comprising:
    at each of the plurality of different sootblower element alignments:
    determining when at least one substantial deposit is located at at least one of two possible locations of the heat exchanger corresponding to that particular sootblower element alignment based on a comparison between the generated respective value during boiler operation and the respective baseline value associated with that particular alignment.

13. The method of claim 7, comprising:
    as the sootblower element is moving and rotating within the boiler, at each of a plurality of different time instances, generating a respective value indicative of the one or more reactive forces exerted on the sootblower element through one or both of the first and second sprays of pressurized fluid for that particular time instance; and
    associating with each of the plurality of different time instances a corresponding one of the plurality of sootblower element alignments.

14. The method of claim 13, comprising:
at each of the plurality of different sootblower element alignments, measuring a respective baseline value, each baseline value indicative of no fouling being present at that particular alignment.

15. The method of claim 14, comprising:
transforming the plurality of generated respective values during boiler operation and the plurality of baseline values into respective first and second sets of frequency-domain data.

16. The method of claim 15, comprising:
reviewing a plurality of frequency bands of the first set of the frequency-domain data to identify a particular frequency band among the plurality of frequency bands, wherein the particular frequency band is more likely than any of the other frequency bands of the plurality to have a response that corresponds to the generated respective values.

17. The method of claim 16, comprising:
transforming the frequency-domain data of the identified frequency band for both the first and second sets of frequency-domain data into corresponding first and second sets of time domain data, wherein each element of the first and second sets of the time domain data is defined by an associated one of the plurality of different time instances and an associated amplitude value.

18. The method of claim 17, wherein each element of the time domain data of the first set is associated with a respective corresponding element in the second set of the time domain data.

19. The method of claim 18, comprising:
for each pair of corresponding elements of the first and second sets of time domain data:
determining when one or more substantial deposits are on the heat exchanger based on a comparison between the associated amplitude value of the element of the first set of time domain data and the corresponding element of the second set of the time domain data.

20. A method of detecting fouling of a heat exchanger of a boiler, the method comprising:
emitting a spray of pressurized fluid from a nozzle of a sootblower element;
generating a value indicative of a reactive force translated back to the sootblower element through the spray of the pressurized fluid, wherein the reactive force is created by an impact of the pressurized fluid on a surface of the heat exchanger or a substantial deposit on the surface of the heat exchanger; and
determining when a substantial deposit is on the surface of the heat exchanger indicating fouling based on the value indicative of the reactive force.

21. A system for detecting fouling of a heat exchanger of a boiler with a sootblower element which emits first and second sprays of pressurized fluid from respective first and second nozzles, the system comprising:
a data acquisition system to generate a value indicative of one or more reactive forces translated back to the sootblower element through one or both of the first and second sprays of the pressurized fluid, wherein the one or more reactive forces are created by impact of one or both of the first and second pressurized fluid sprays on the heat exchanger or one or more substantial deposits on the heat exchanger; and
the data acquisition system further configured to determine when a substantial deposit is on the heat exchanger indicating fouling based on the generated value.

22. The system of claim 21, comprising:
a strain gauge sensing element arranged on the sootblower element to sense a strain value on the sootblower element, wherein the generated value is based on the sensed strain value.

23. The system of claim 22, further comprising:
a linear encoder to determine a linear position of the sootblower element relative to a reference position;
a rotary encoder to determine a rotational orientation of the sootblower element relative to a home position;
a control system coupled to and receiving data from said linear and rotary encoders corresponding to sensed linear and angular positions of the sootblower element; and
the data acquisition system coupled to the strain gauge sensing element to record strain values sensed by the strain gauge sensing element, the data acquisition system receiving and storing sootblower element alignment information from the control system comprising sootblower linear and angular positions.

24. The system of claim 22, wherein the data acquisition system is configured to:
determine whether one or more substantial deposits are on the heat exchanger based on the generated value and a linear position and a rotational orientation of the nozzles; and
determine, when it is determined that one or more substantial deposits are on the heat exchanger, a particular pair of possible locations of the one or more substantial deposits on the heat exchanger based on the linear position and the rotational orientation of the nozzles.

25. The system of claim 21, wherein the data acquisition system is configured to:
generate, at each of a plurality of different sootblower element alignments within the boiler during boiler operation, a respective value indicative of the one or more reactive forces translated back to the sootblower element through one or both of the first and second sprays of the pressurized fluid emitted by the sootblower element when at that particular alignment, wherein each sootblower element alignment is defined by a corresponding linear position between a first home position and a second maximum-in position, and a rotational orientation of the sootblower element.

26. The system of claim 25, wherein the data acquisition system is configured to:
construct, for the sootblower element, a map that indicates whether at least one substantial deposit is located at at least one heat exchanger location corresponding to each of the plurality of different sootblower element alignments.

27. A computer program product for detecting fouling of a heat exchanger of a boiler with a sootblower element which emits first and second sprays of pressurized fluid from respective first and second nozzles, the computer program product comprising:
a non-transitory computer readable storage medium having computer readable program code embodied therewith, the computer readable program code comprising:
computer readable program code to generate a value indicative of one or more reactive forces translated back to the sootblower element through one or both of the first and second sprays of the pressurized fluid, wherein the one or more reactive forces are created by impact of one or both of the first and second pressurized fluid sprays on the heat exchanger or one or more substantial deposits on the heat exchanger; and computer readable program code to determine when a substantial deposit is on the heat exchanger indicating fouling based on the generated value.

28. The computer program product of claim 27, comprising:

computer readable program code to receive a sensed strain value from a strain gauge sensing element arranged on the sootblower element to sense the strain value on the sootblower element, wherein the generated value is based on the sensed strain value.

29. The computer program product of claim 28, comprising:

computer readable program code to receive data from a linear encoder and a rotary encoder corresponding to sensed linear and angular positions of the sootblower element;

computer readable program code to record strain values sensed by the strain gauge sensing element; and computer readable program code to store sootblower element alignment information comprising sootblower linear and angular positions.

30. The computer program product of claim 27, comprising computer readable program code to:

determine whether one or more substantial deposits are on the heat exchanger based on the generated value and a linear position and a rotational orientation of the nozzles; and determine, when it is determined that one or more substantial deposits are on the heat exchanger, a particular pair of possible locations of the one or more substantial deposits on the heat exchanger based on the linear position and the rotational orientation of the nozzles.

31. The computer program product of claim 27, comprising:

computer readable program code to generate, at each of a plurality of different sootblower element alignments within the boiler during boiler operation, a respective value indicative of the one or more reactive forces translated back to the sootblower element through one or both of the first and second sprays of the pressurized fluid emitted by the sootblower element when at that particular alignment, wherein each sootblower element alignment is defined by a corresponding linear position between a first home position and a second maximum-in position, and a rotational orientation of the sootblower element.

32. The computer program product of claim 31, comprising:

computer readable program code to construct, for the sootblower element, a map that indicates whether at least one substantial deposit is located at at least one heat exchanger location corresponding to each of the plurality of different sootblower element alignments.

* * * * *